United States Patent
Lee et al.

(10) Patent No.: US 9,318,744 B2
(45) Date of Patent: Apr. 19, 2016

(54) POLYMER ELECTRODE FOR LITHIUM SECONDARY BATTERY INCLUDING THE POLYMER AND LITHIUM SECOND BATTERY EMPLOYING THE ELECTRODE

(71) Applicant: SAMSUNG SDI CO., LTD., Yongin-si, Gyeonggi-do (KR)

(72) Inventors: Beom-Wook Lee, Yongin-si (KR);
Bum-Jin Chang, Yongin-si (KR);
Hye-Sun Jeong, Yongin-si (KR);
Sam-Jin Park, Yongin-si (KR);
Kwan-Ku Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 93 days.

(21) Appl. No.: 14/037,300

(22) Filed: Sep. 25, 2013

(65) Prior Publication Data

US 2014/0106218 A1    Apr. 17, 2014

Related U.S. Application Data

(60) Provisional application No. 61/712,666, filed on Oct. 11, 2012.

(51) Int. Cl.
| | |
|---|---|
| *H01M 4/13* | (2010.01) |
| *C08F 30/04* | (2006.01) |
| *C08F 220/56* | (2006.01) |
| *H01M 4/62* | (2006.01) |
| *C08F 220/06* | (2006.01) |
| *C08F 220/34* | (2006.01) |
| *C08F 226/04* | (2006.01) |
| *H01M 4/131* | (2010.01) |
| *H01M 10/052* | (2010.01) |

(52) U.S. Cl.
CPC .............. *H01M 4/622* (2013.01); *C08F 220/06* (2013.01); *C08F 220/34* (2013.01); *C08F 226/04* (2013.01); *H01M 4/131* (2013.01); *H01M 10/052* (2013.01)

(58) Field of Classification Search
None
See application file for complete search history.

(56) References Cited

U.S. PATENT DOCUMENTS

| | | |
|---|---|---|
| 5,076,846 A | 12/1991 | Buri et al. |
| 2007/0020501 A1* | 1/2007 | Li et al. ................. 429/33 |
| 2007/0110699 A1 | 5/2007 | Sherry |
| 2007/0264568 A1 | 11/2007 | Ryu et al. |
| 2009/0136848 A1 | 5/2009 | Minami et al. |
| 2009/0246632 A1 | 10/2009 | Fukui et al. |
| 2011/0123863 A1 | 5/2011 | Choi et al. |

FOREIGN PATENT DOCUMENTS

| | | |
|---|---|---|
| JP | 2010-018673 A | 1/2010 |
| KR | 1994-0001535 B1 | 2/1994 |
| KR | 10-2007-0076151 A | 7/2007 |
| KR | 10-2009-0007710 A | 1/2009 |
| KR | 10-2009-0103807 A | 10/2009 |
| KR | 10-2009-0125800 A | 12/2009 |
| KR | 10-2011-0056151 A | 5/2011 |
| WO | WO 98/47937 A1 | 10/1998 |

OTHER PUBLICATIONS

European Office action and Search Report for Patent Application No. 13188351.4, dated Jan. 24, 2014, 5 pages.

\* cited by examiner

*Primary Examiner* — Susannah Chung
*Assistant Examiner* — Robert T Butcher
(74) *Attorney, Agent, or Firm* — Lewis Roca Rothgerber Christie LLP

(57) ABSTRACT

A polymer includes a first repeating unit having a cationic group and a second repeating unit having an anionic group. The polymer may further include a third repeating unit having a non-ionic group. The polymer may include first and second polymers, each of which includes a first repeating having a cationic group and a second repeating unit having an anionic group. The cationic group of the first polymer may form an intermolecular bond with the anionic group of the second polymer, and the anionic group of the first polymer may form an intermolecular bond with the cationic group of the second polymer. An electrode for a lithium secondary battery includes the polymer, and a lithium secondary battery employs the electrode.

9 Claims, 2 Drawing Sheets

POLYMER ELECTRODE FOR LITHIUM SECONDARY BATTERY INCLUDING THE POLYMER AND LITHIUM SECOND BATTERY EMPLOYING THE ELECTRODE

CROSS REFERENCE TO RELATED APPLICATIONS

This application claims priority to and the benefit of U.S. Provisional Application No. 61/712,666, filed Oct. 11, 2012, the entire content of which is incorporated herein by reference.

BACKGROUND

1. Technical Field

Embodiments of the present invention relate to a polymer, an electrode for a lithium secondary battery including the polymer, and a lithium secondary battery employing the electrode.

2. Related Art

Lithium secondary batteries have high voltage and high energy, and are therefore useful in a variety of applications. For example, electric vehicles (e.g., hybrid electric vehicles (HEVs) or plug-in hybrid electric vehicles (PHEVs)) need batteries capable of operating at high temperatures, being charged or discharged with a lot of electricity, and having a long lifetime between charges. Accordingly, electric vehicles require lithium secondary batteries with good discharge capacities and lifespan characteristics.

To improve the capacity and lifespan of lithium secondary batteries, the positive electrode and negative electrode materials, as well as the binder (which make up the lithium secondary battery) have been actively studied.

As a binder for a negative electrode of a lithium secondary battery, a mixture of sodium carboxymethyl cellulose (Na-CMC) and an aqueous dispersion of styrene-butadiene rubber (SBR) has been used. Na-CMC maintains the dispersibility of the active material and the stability of the slurry. The aqueous dispersion of SBR improves the flexibility of the electrode plate and the binding force of the active material layer with respect to the substrate. Accordingly, use of these materials has conventionally been considered important. However, SBR is non-conductive (i.e., it is not electrically conductive), and therefore acts as a resistor in the battery, thereby adversely affecting the lifespan of the battery.

SUMMARY

Aspects of the present invention are directed to a polymer, an electrode for a lithium secondary battery including the polymer, and a lithium secondary battery employing the electrode.

According to an aspect of the present invention, a polymer includes a first repeating unit having a cationic group and a second repeating unit having an anionic group. The cationic group and the anionic group of the polymer form an intermolecular ionic bond with an anionic group and a cationic group, respectively, of another polymer.

According to another aspect of the present invention, an electrode binder composition includes the polymer and an electrode for a lithium secondary battery including the binder.

According to still another aspect of the present invention, a lithium secondary battery includes the electrode.

When the novel polymer according to embodiments of the present invention is used as an ion conductive binder of an electrode for a lithium secondary battery, the battery may have lower internal resistance, resulting in a lithium secondary battery having high capacity retention (i.e., an increased lifespan).

DETAILED DESCRIPTION OF THE INVENTION

Figure 1:
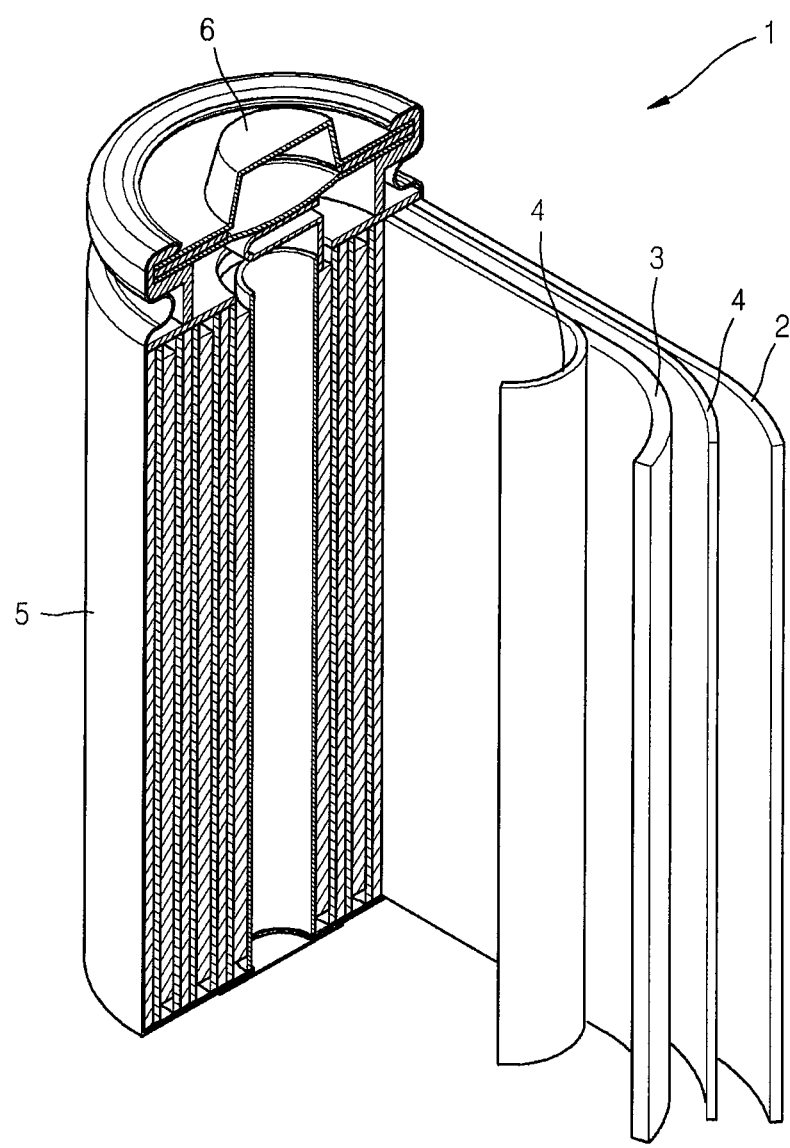
FIG. 1 is a schematic view of a lithium secondary battery according to an embodiment of the present invention.

Hereinafter, a polymer, a method of preparing the same, an electrode including the polymer, and a lithium secondary battery including the electrode, according to embodiments of the present invention, will be described.

A polymer according to an embodiment of the present invention includes a first repeating unit having a cationic group and a second repeating unit having an anionic group. The first repeating unit and the second repeating unit may be bonded to each other via an ionic bond.

In an embodiment of the present invention, the phrase "the first repeating unit and the second repeating unit may be bonded to each other via an ionic bond," and similar phrases, refers to an intramolecular ionic bond between a cationic group (or anionic group) of a polymer and an anionic group (or cationic group) of the same polymer, or to an intermolecular bond between a cationic group (or anionic group) of a first polymer and an anionic group (or cationic group) of a second polymer.

The polymer is an amphoteric compound having a cationic group and an anionic group in its molecular structure. In an embodiment of the present invention, a first repeating unit having the cationic group, and a second repeating unit having the anionic group may each be located in the back bone or a side chain of the polymer. For example, considering use, synthesis and function, the first and second repeating units may be located in a side chain of the polymer.

In an embodiment of the present invention, the polymer may include an anionic group in the same or a different molecule as the first repeating unit having the cationic group. The anionic group in the same or different molecule is a counter ion of the cationic group of the first repeating unit.

In an embodiment of the present invention, the polymer may include a cationic group in the same or a different molecule as the second repeating unit having the anionic group. The cationic group in the same or different molecule is a counter ion of the anionic group of the second repeating unit.

The polymer having the cationic group intermolecularly bonded to the anionic group may be prepared by polymerizing a monomer having a cationic group and a monomer having an anionic group to form a polymer. Then, corresponding counter ions of the cationic group and the anionic group existing in the polymer are removed, thereby forming an intermolecular ionic bond between the cationic group and the anionic group in the polymer. This process is described below in detail.

The monomer having a cationic group may be represented by Chemical structure A below, and the monomer having an anionic group may be represented by Chemical structure B below. Chemical structures A to D and 1 to 11 are schematic representations of embodiments of the present invention, and are not intended to limit the scope of the polymers.

Chemical structure A $$M1\sim\sim C^+ \ (an)^-$$

In Chemical structure A, M1 refers to the monomer back bone, $\sim\sim\sim\sim$ refers to the bond between the monomer back bone M1 and C$^+$, C$^+$ refers to the cationic group, and (an)$^-$ refers to the counter ion of the cationic group (C$^+$).

Chemical structure B $$M2\sim\sim A^- \ (cat)^+$$

In Chemical structure B, M2 refers to the monomer back bone, $\sim\sim\sim\sim$ refers to the bond between the monomer back bone M2 and A$^-$, A$^-$ refers to the anionic group, and (cat)$^+$ refers to the counter ion of the anionic group A$^-$.

The monomer having a cationic group and the monomer having an anionic group may be polymerized to form a polymer represented by Chemical structure C below. The polymerization may be carried out using any conventional polymerization technique, such as radical polymerization, anionic polymerization, cationic polymerization, or condensation polymerization.

Chemical structure C

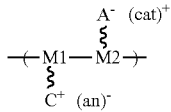

In chemical structure C, M1 refers to the monomer backbone of the monomer including the cationic group, M2 refers to the monomer back bone of the monomer including the anionic group, C$^+$ refers to the cationic group, (an)$^-$ refers to the counter ion of the cationic group C$^+$, A$^-$ refers to the anionic group, and (cat)$^+$ refers to the counter ion of the anionic group A$^-$.

The counter ions (an)$^-$ and (cat)$^+$ are removed from the polymer of Chemical Structure C in the form of (an)(cat), thereby preparing a polymer represented by one of Chemical Structures D(a), D(b), or D(c).

Chemical structure D

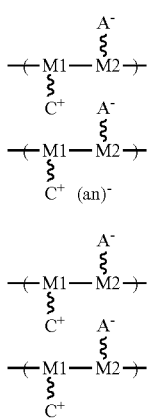

(a)

(b)

(c)

In Chemical Structures D(a), D(b) and D(c), M1 refers to the monomer backbone of the monomer including the cationic group, M2 refers to the monomer back bone of the monomer including the anionic group, C$^+$ refers to the cationic group, (an)$^-$ refers to the counter ion of the cationic group C$^+$, A$^-$ refers to the anionic group, and (cat)$^+$ refers to the counter ion of the anionic group A$^-$.

Chemical Structure D(a) refers to a polymer in which the mole ratio of the cationic group to the anionic group is relatively high. Chemical Structure D(b) refers to a polymer in which the mole ratio of the cationic group to the anionic group in the polymer is 1. Chemical Structure D(c) refers to a polymer in which the mole ratio of the anionic group to the cationic group is relatively high.

Chemical structures D(a), D(b), and D(c) represent polymers including various intermolecular ionic bonds between the monomers. However, if the ionic bonds between the monomers occur in the same polymer molecule, the polymer may be represented by one of Chemical Structures E(a), E(b), and E(c), below. That is, the polymers represented by Chemical Structures D(a), D(b), and D(c) correspond to Chemical Structures E(a), E(b), and E(c), respectively, except that the ionic bonds between the monomers in the polymers depicted in Chemical Structures D(a), D(b) and D(c) are intermolecular while the ionic bonds between the monomers in the polymers depicted in Chemical Structures E(a), E(b) and E(c) are intramolecular.

Chemical structure E

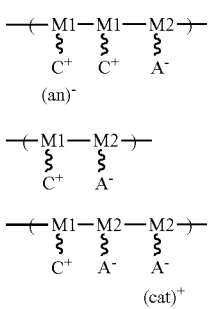

(a)

(b)

(c)

In an embodiment of the present invention, the first repeating unit may be represented by Formula 1(a), 1(b) or Formula 3, below.

Formula 1(a)

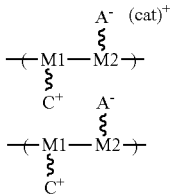

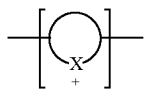

Formula 1(b)

or.

In Formulae 1(a) and 1(b),

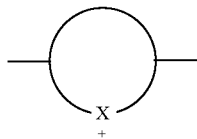

represents a 3- to 31-membered ring including 2 to 20 carbon atoms and one or more heteroatom (including the heteroatom in X). X is —N(R')(R''), —S(R'), or —P(R')(R''). $R_1$ to $R_4$ are each independently hydrogen, a unsubstituted or substituted C1-C30 (for example, C1-C10 or C3-C5) alkyl group, a unsubstituted or substituted C1-C30 (for example, C1-C10 or C3-C5) alkoxy group, a unsubstituted or substituted C6-C30 (for example, C6-C10) aryl group, a unsubstituted or substituted C7-C30 (for example, C8-C11) arylalkyl, a unsubstituted or substituted C6-C30 (for example, C6-C10) aryloxy group, a unsubstituted or substituted C3-C30 (for example, C4-C9) heteroaryl group, a unsubstituted or substituted C3-C30 (for example, C4-C9) heteroaryloxy group, a unsubstituted or substituted C4-C30 (for example, C5-C10) cycloalkyl group, or a unsubstituted or substituted C3-C30 (for example, C5-C9) heterocycloalkyl group.

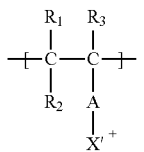

Formula 3

In Formula 3, X' is —N(R')(R'')(R'''), —S(R')(R''), —OP(R')(R'')(R'''), or —P(R')(R'') (R'''). $R_1$ to $R_3$ are each independently hydrogen, a unsubstituted or substituted C1-C30 (for example, C1-C10 or C3-C5) alkyl group, a unsubstituted or substituted C1-C30 (for example, C1-C10 or C3-C5) alkoxy group, a unsubstituted or substituted C6-C30 (for example, C6-C10) aryl group, unsubstituted or substituted C7-C30 (for example, C8-C11) arylalkyl, a unsubstituted or substituted C6-C30 (for example, C6-C10) aryloxy group, a unsubstituted or substituted C3-C30 (for example, C4-C9) heteroaryl group, a unsubstituted or substituted C3-C30 (for example, C4-C9) heteroaryloxy group, a unsubstituted or substituted C4-C30 (for example, C5-C10) cycloalkyl group, or a unsubstituted or substituted C3-C30 (for example, C4-C9) heterocycloalkyl group.

A represents a simple chemical bond, or a linkage selected from C1-C30 (for example, C1-C10 or C3-C5) alkyls, C6-C30 (for example, C6-C10) aryls, C7-C30 (for example, C8-C11) arylalkyls, C1-C30 (for example, C5-C9) heteroaryls, C4-C30 (for example, C5-C10) cycloalkyls, and C1-C30 (for example, C4-C9) heterocycloalkyls. The linkage groups represented by A may be unsubstituted or may be substituted with at least one substituent selected from carbonyl groups (—CO—), oxy groups (—O—), carbonyloxy groups (—COO— or —OCO—), iminocarbonyl groups (—NH—CO— or —CO—NH—), iminosulfonyl groups (—NH—SO_2— or —SO_2—NH—), sulfanyl groups (—S—), sulfinyl groups (—S(O)—), sulfonyl groups (—SO_2—), sulfonyloxy groups (—SO_2—O— or —O—SO_2—), imino groups (—NH—), methylene repeating units (—(CH2)n-, n=1 to 20), methyleneoxide repeating units (—(CH$_2$O)$_n$—, n=1 to 20), ethyleneoxide repeating units (—(CH$_2$CH$_2$O)$_n$—, n=1 to 20), and propyleneoxide repeating units (—(CH(CH$_3$)CH$_2$O)$_n$—, n=1 to 20).

R', R'' and R''' may each independently be a C1-C30 (for example, C1-C10 or C3-C5) alkyl group, a C1-C30 (for example, C1-C10 or C3-C5) alkoxy group, a C6-C30 (for example, C6-C10) aryl group, a C7-C30 (for example, C8-C11) arylalkyl, a C6-C30 (for example, C6-C10) aryloxy group, a C3-C30 (for example, C4-C9) heteroaryl group, a C3-C30 (for example, C4-C9) heteroaryloxy group, a C4-C30 (for example, C5-C10) cycloalkyl group, or a C3-C30 (for example, C4-C9) heterocycloalkyl group.

In an embodiment of the present invention, the polymer may contain at least one first repeating unit represented by Formula 1(a), Formula 1(b) or Formula 3, and optionally between 1 and 3 additional repeating units represented by Formula 1(a), Formula 1(b) and/or Formula 3. For example, the polymer may contain two repeating units represented by Formula 1(a), Formula 1(b) or Formula 3, or one repeating unit represented by Formula 1(a) or Formula 1(b) and one repeating unit represented by Formula 3.

In an embodiment of the present invention, the second repeating unit may be represented by Formula 4, below.

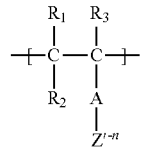

Formula 4

In Formula 4, $R_1$ to $R_3$ and A are the same as defined in Formula 3 above. Z' is a carboxylate group (—C(=O)O), a sulfate group (—OS(=O)$_2$O), a sulfite group (—OS(=O)O), a sulfinate group (—S(=O)O), a phosphate group (—OP(=O)(O)$_2$), or a phosphonate group (—P(=O)(O)$_2$). Also, n is 1 or 2.

In an embodiment of the present invention, the polymer may contain at least one second repeating unit represented by Formula 4, and optionally between 1 and 3 additional repeating units represented by Formula 4. For example, the polymer may contain two repeating units represented by Formula 4.

In an embodiment of the present invention, the polymer may further contain a third repeating unit that is neutral (i.e., non-ionic). In an embodiment of the present invention, the third repeating unit may be represented by Formula 23, below.

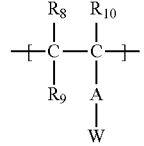

Formula 23

In Formula 23, W is a carboxyl group, a hydroxyl group, an amine group, an amide group, an imide group, a nitrile group, a sulfone group, a halogen group, a silane group, or Si(R')(R")(R'''). R', R", and R''' may each independently be a C1-C20 alkyl group, a C1-C20 alkoxy group or a halogen atom.

A is the same as defined in Formula 3 above.

$R_8$ to $R_{10}$ are each independently hydrogen, a unsubstituted or substituted C1-C30 (for example, C1-C10 or C3-C5) alkyl group, a unsubstituted or substituted C1-C30 (for example, C1-C10 or C3-C5) alkoxy group, a unsubstituted or substituted C6-C30 (for example, C6-C10) aryl group, a unsubstituted or substituted C7-C30 (for example, C8-C11) arylalkyl, a unsubstituted or substituted C6-C30 (for example, C6-C10) aryloxy group, a unsubstituted or substituted C3-C30 (for example, C4-C9) heteroaryl group, a unsubstituted or substituted C3-C30 (for example, C4-C9) heteroaryloxy group, a unsubstituted or substituted C4-C30 (for example, C5-C10) cycloalkyl group, or a unsubstituted or substituted C3-C30 (for example, C4-C9) heterocycloalkyl group.

In an embodiment of the present invention, the polymer may contain at least one third repeating unit represented by Formula 23, and optionally between 1 and 3 additional third repeating units represented by Formula 23. For example, the polymer may contain two third repeating units represented by Formula 23.

In an embodiment of the present invention, in Formula 1(a) and 1(b),

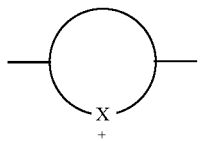

may be a C2-C10 heterocyclic ring (for example, a C3-C6 heterocyclic ring, and X may be —N(R')(R")).

In an embodiment of the present invention, in Formula 3, A and X together may form a C1-C30 alkyl including a carbonyloxy group (—COO—) group with a terminal —N(R')(R")(R''') and/or —P(R')(R")(R''') group.

In an embodiment of the present invention, in Formula 23, A and W together may form a hydroxyl group or a C1-C30 (for example, C1-C10 or C3-C5) alkyl including a carbonyloxy group (—COO—) and a terminal hydroxyl group.

In an embodiment of the present invention, in Formula 4, A and $z^{m-}$ together form a carboxylate and/or a C1-C30 (for example C1-C10 or C3-C5) alkyl including a carbonyloxy group (—COO—) and a terminal phosphonate group.

In an embodiment of the present invention, R', R" and R''' are each independently a C1-C30 alkyl group, for example a C1-C5 alkyl group. For example, in an embodiment, each of R', R" and R''' (when present) is a methyl group.

Nonlimiting examples of the monomer having a cationic group include acryloyl oxyethyl trimethylammonium chloride, acryloyl oxyethyl triphosphonium chloride, and diallyldimethyl ammonium chloride.

Nonlimiting examples of the monomer having an anionic group include sodium acrylate, and sodium ethyleneglycol acrylate phosphate.

In addition to the monomer having a cationic group and the monomer having an anionic group, a non-ionic monomer may be further used. Nonlimiting examples of the non-ionic monomer include vinyl acetate, and 2-hydroxyethyl acrylate.

Nonlimiting examples of the cationic group of the first repeating unit include ammonium groups, sulfonium groups, and phosphonium groups.

Nonlimiting examples of the anionic group of the second repeating unit include carboxylate groups, sulfate groups, sulfite groups, sulfinate groups, phosphate groups, and phosphonate groups.

The polymer may be a saturated hydrocarbon, an unsaturated hydrocarbon, or an aromatic compound.

In an embodiment of the present invention, the anion counter ion $(an)^-$ (when present as a counter ion to the cationic repeating unit) may be, for example, an ammonium ion, or an anionic group of an organic or inorganic acid. The anionic group of the organic acid may be an anion of a C1-C18 monoacid or polyacid. Nonlimiting examples of the anion include $HCOO^-$ from formic acid, $CH_3COO^-$ from acetic acid, $CF_3COO^-$ from trifluoroacetic acid, $CH_3CH_2COO^-$ from propionic acid, $COO^{2-}$ from oxalic acid, $HOC(CH_2COO-)_2COO^-$ from citric acid, and $CH_3(CH_2)_{16}COO^-$ from stearic acid having 18 carbon atoms.

Nonlimiting examples of the anion of the inorganic acid include $CO_3^{-2}$ or $HCO_3^-$ from carbonic acid, $Cl^-$ from hydrochloric acid, $Br^-$ from bromic acid, $I^-$ from iodic acid, $SO_4^{-2}$ or $HSO_4^-$ from sulfuric acid, $NO_3^-$ from nitric acid, $PO_4^{-3}$, $HPO_3^{-2}$ or $H_2PO_3^-$ from phosphoric acid, $SO_3^{-2}$ or $HSO_3^-$ from sulfurous acid, $NO_2^-$ from nitrous acid, $P_2O_7^{-4}$ from pyrophosphoric acid, an anion of a Lewis acid, such as $BX_4^-$ (where X is a halogen atom) of a Lewis acid, $AlX_4^-$ (where X is a halogen atom), or $PX_6^-$ (where X is a halogen atom), $AsX^-$ (where X is a halogen atom), $ClO^-$, and a composite of an organic and inorganic acid, or an anion of an acid, such as $CH_3SO_3^-$, $CF_3SO_3^-$, $CH_3CH_2SO_3^-$, or $N(CF_3SO_3)_2^-$.

In an embodiment of the present invention, the cationic group may be a quaternary ammonium ion, and may be represented by Chemical Structure 1(a), or Chemical Structure 1(b) which shows a cyclic ammonium ion.

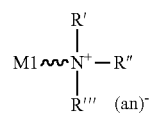

Chemical structure 1(a)

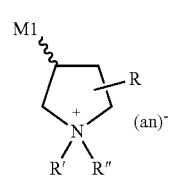

Chemical Structure 1(b)

In Chemical Structures 1(a) and 1(b), M1 and ~~~~ are as defined above in Chemical Structure A above. R', R", and R''' may each independently be hydrogen, a C1-C30 (for example, C1-C10 or C3-C5) alkyl, a C6-C30 (for example, C6-C10) aryl, a C7-C30 (for example, C8-C11) arylalkyl, a C1-C30 (for example, C5-C9) heteroaryl, a C4-C30 (for example, C5-C10) cycloalkyl, or a C1-C30 (for example C5-C9) heterocycloalkyl. These groups may be unsubstituted, or may be substituted with at least one substituent selected from carbonyl groups (—CO—), oxy groups (—O—), carbonyloxy groups (—COO⁻ or —OCO⁻), iminocarbonyl groups (—NH⁻CO— or —CO⁻NH—), iminosulfonyl groups (—NH—SO²— or —SO²—NH—), sulfanyl groups (—S—), sulfinyl groups (—S(O)—), sulfonyl groups (—SO₂—), sulfonyloxy groups (—SO₂—O— or —O—SO₂—), and imino groups (—NH—).

R is a mono-substituted or polysubstituted substituent, and may be hydrogen, a halogen atom, a hydroxy group, a cyano group, a C1-C30 (for example, C1-C10 or C3-C5) alkyl group, a C1-C30 (for example, C1-C10 or C3-C5) alkoxy group, a C6-C30 (for example, C6-C10) aryl group, a C7-C30 (for example, C8-C11) arylalkyl, a C6-C30 (for example, C6-C10) aryloxy group, a C3-C30 (for example, C4-C9) heteroaryl group, a C3-C30 (for example, C4-C9) heteroaryloxy group, a C4-C30 (for example, C5-C10) cycloalkyl group, or a C3-C30 (for example, C5-C9) heterocycloalkyl group.

In an embodiment of the present invention, the ammonium group of Chemical Structure 1(b) may be a heterocycloalkyl group, or a heteroaryl ring. An example of the ammonium group of Chemical structure 1(b) is a pyridine derivative represented by Chemical Structure 2, below.

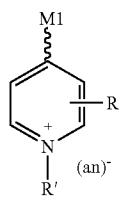

Chemical Structure 2

In Chemical Structure 2, M1, ~~~~, R', R, and (an)⁻ are as defined above with respect to Chemical Structures 1(a) and 1(b), above.

In an embodiment of the present invention, the ammonium group of Chemical Structure 1(b) may be represented by Chemical Structure 3(a) or 3(b), below.

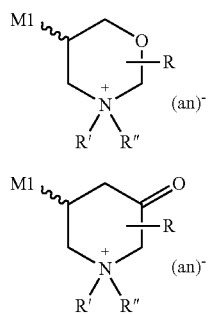

Chemical structure 3(a)

Chemical Structure 3(b)

In Chemical Structures 3(a) and 3(b), M1, ~~~~, R', R'', R, and (an)⁻ are as defined above with respect to Chemical Structures 1(a) and 1(b).

In an embodiment of the present invention, the cationic group is a tertiary sulfonium group represented by Chemical Structure 4(a) or 4(b), below.

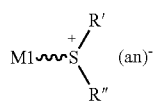

Chemical structure 4(a)

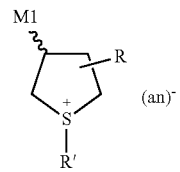

Chemical Structure 4(b)

In Chemical Structure 4(a) and 4(b), M1, ~~~~ R', R'', R, and (an)⁻ are as defined above with respect to Chemical Structures 1(a) and 1(b), above.

In an embodiment of the present invention, the sulfonium group of Chemical Structure 4(b) may be a heterocycloalkyl group, or a heteroaryl ring.

In an embodiment of the present invention, the cationic group may be a quaternary phosphonium group represented by Chemical Structure 5(a) or 5(b), below.

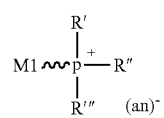

Chemical Structure 5(a)

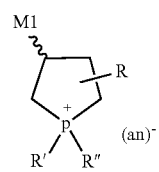

Chemical Structure 5(b)

In Chemical Structures 5(a) and 5(b), M1, ~~~~ R', R'', R, and (an)⁻ are as defined above with respect to Chemical Structures 1(a) and 1(b), above.

In an embodiment of the present invention, the phosphonium group of Chemical Structure 5(b) may be a heterocycloalkyl group, or a heteroaryl ring.

In synthesizing the polymer, in some embodiments, a single one of the cationic groups represented by Chemical Structures 1(a), 1(b), 2(a), 2(b), 3(a), 3(b), 4(a), 4(b), 5(a) and 5(b) may be used as the monomer having the cationic group. However, in some embodiments, two or more of these cationic groups may be used in combination.

In an embodiment of the present invention, nonlimiting examples of the cation counter ion (cat)⁺ (when present as a counter ion to the anionic group) include alkali metal ions, such as lithium ions (Li⁺), sodium ions (Na⁺), or potassium ions (K⁺); alkali earth metal ions, such as magnesium ions (Mg²⁺) or calcium ions (Ca²⁺); transition metal ions, such as Zn²⁺; post-transition metal ions, such as Al³⁺; and secondary, tertiary, and quaternary ammonium ions formed by hydrogenation or alkylation of a primary amine, secondary amine, or tertiary amine, such as ammonium hydroxide, methylamine, dimethylamine, trimethylamine, ethylamine, diethylamine, triethylamine, propylamine, dipropylamine, butylamine, pentylamine, hexylamine, cyclohexylamine, monomethanolamine, dimethanolamine, trimethanolamine, monoethanolamine, diethanolamine, or triethanolamine.

In an embodiment of the present invention, a carboxylate group (which can be the anionic group of the second repeating unit) may be represented by Chemical Structure 6, below.

Chemical structure 6

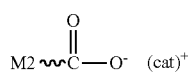

In Chemical structure 6, M2 and ~~~~ are as defined above with respect to Chemical Structure B, and (cat)$^+$ refers to a counter ion of the carboxylate group.

A sulfate group (which can be the anionic group of the polymer) may be represented by Chemical Structure 7, below.

Chemical structure 7

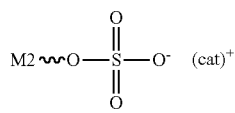

In Chemical Structure 7, M2, ~~~~, and (cat)$^+$ are as defined above with respect to Chemical Structure 6.

A sulfite group (which can be the anionic group of the polymer) may be represented by Chemical Structure 8, below.

Chemical structure 8

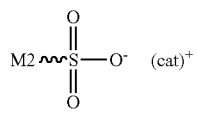

In Chemical Structure 8, M2, ~~~~, and (cat)$^+$ are as defined above with respect to Chemical Structure 6.

A sulfinate group (which can be the anionic group of the polymer) may be represented by Chemical Structure 9, below.

Chemical structure 9

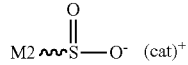

In Chemical structure 9, M2, ~~~~, and (cat)$^+$ are as defined above with respect to Chemical Structure 6.

A phosphate group (which can be the anionic group of the polymer) may be represented by Chemical Structure 10, below.

Chemical structure 10

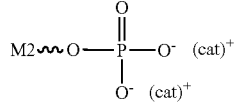

In Chemical Structure 10, M2, ~~~~, and (cat)$^+$ are as defined above with respect to Chemical Structure 6.

A phosphonate group (which can be the anionic group of the polymer) may be represented by Chemical Structure 11, below.

Chemical structure 11

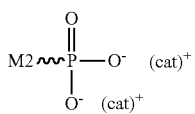

In Chemical Structure 11, M2, ~~~~, and (cat)$^+$ are as defined above with respect to Chemical Structure 6.

In synthesizing the polymer, a single one of the anionic groups represented by Chemical Structures 6 to 11 may be used as the monomer having the anionic group. However, in some embodiments, two or more of these groups may be used in combination.

In the polymer, a mixed molar ratio of the first repeating unit having the cationic group to the second repeating unit having the anionic group may be 5:95 to 95:5, for example, 10:90 to 90:10, 20:80 to 80:20, 40:60 to 60:40 or 50:50.

In an embodiment of the present invention, the first repeating unit having the cationic group may be, for example, a first repeating unit represented by Formula 1(a) or 1(b), above.

In Formula 1(a) and 1(b), the (an)$^-$ counter ion is not shown because the counter ion is an anion within the same molecule or in a different molecule.

In embodiments of the present invention,

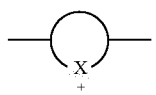

in Formula 1(a) or 1(b) may be, for example, a cycloalkyl group, an aryl ring, or a heteroaryl ring. In some embodiments, for example,

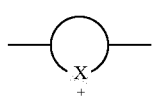

may be one of the moieties represented by Formula 2 below.

Formula 2

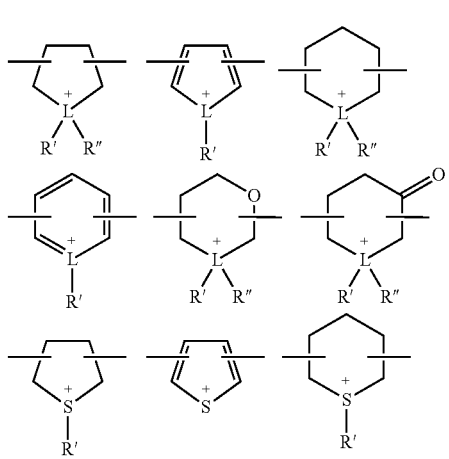

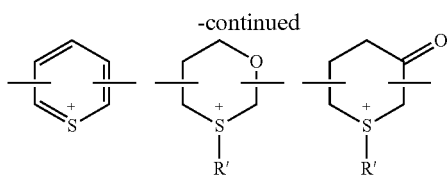

In the moieties represented by Formula 2, L may be N or P, and R' and R" may each independently be a C1-C30 (for example, C1-C10 or C3-C5) alkyl group, a C1-C30 (for example, C1-C10 or C3-C5) alkoxy group, a C6-C30 (for example, C6-C10) aryl group, a C7-C30 (for example, C8-C11) arylalkyl, a C6-C30 (for example, C6-C10) aryloxy group, a C3-C30 (for example, C4-C9) heteroaryl group, a C3-C30 (for example, C4-C9) heteroaryloxy group, a C4-C30 (for example, C5-C10) cycloalkyl group, or a C3-C30 (for example, C4-C9) heterocycloalkyl group.

The rings shown in the moieties represented by Formula 2 are not depicted with substituents. However, in an embodiment of the present invention, the rings may further include one or more substituents (i.e., the rings may be mono-substituted or polysubstituted). Nonlimiting examples of such substituents include halogen atoms, hydroxy groups, cyano groups, C1-C30 (for example, C1-C10 or C3-C5) alkyl groups, C1-C30 (for example, C1-C10 or C3-C5) alkoxy groups, C6-C30 (for example, C6-C10) aryl groups, C7-C30 (for example, C8-C11) arylalkyl groups, C6-C30 (for example, C6-C10) aryloxy groups, C3-C30 (for example, C4-C9) heteroaryl groups, C3-C30 (for example, C4-C9) heteroaryloxy groups, C4-C30 (for example, C5-C10) cycloalkyl groups, and C3-C30 (for example, C4-C9) heterocycloalkyl groups.

In an embodiment of the present invention, the first repeating unit having the cationic group may be, for example, a first repeating unit represented by Formula 3, above.

The second repeating unit of the polymer may be, for example, a second repeating unit represented by Formula 4, above.

In Formula 4, the (cat)$^+$ counter ion is not shown because the counter ion is a cation within the same molecule or in a different molecule.

A degree of polymerization of the polymer according to an embodiment of the present invention may be about 100 to about 10,000. As used herein, "degree of polymerization" refers to the amount of first repeating units, second repeating units and, if present, third repeating units. For example, if the polymer represented by Formula 8 (below) has a degree of polymerization of 100, there would 100 units of each of the repeating units represented by x-m (i.e., the portion of the first repeating unit that has a counter ion), m (i.e., the first repeating unit) and y (i.e., the second repeating unit).

In an embodiment of the present invention, a weight average molecular weight of the polymer may be about 5,000 to about 1,000,000 g/mol. In an embodiment of the present invention, the viscosity of the polymer (i.e., an aqueous solution of the polymer prepared by dissolving 5 weight % solids content in pure water) may be about 1,000 to about 1,000,000 cP (measured at, for example, 20° C.). In an exemplary embodiment of the present invention, the viscosity of the polymer may be about 10,000 to about 1,000,00 cP, for example about 15,000 to about 75,0000, or 25,000 to 50,000 cP.

In an embodiment of the present invention, the polymer may be, for example, a polymer including the first repeating unit represented by Formula 1 and the second repeating unit represented by Formula 4. Alternatively, the polymer may include the first repeating unit represented by Formula 3 and the second repeating unit represented by Formula 4.

In an embodiment of the present invention, the polymer may include the cationic group in a molar fraction greater than a molar fraction of the anionic group. Alternatively, the polymer may include the anionic group in a molar fraction greater than a molar fraction of the cationic group. In another alternative, the polymer may include the anionic and cationic groups in generally equal molar fractions.

In calculating the molar fractions of the anionic and cationic groups, the content of charged groups and groups with counter ions are taken together. For example, if certain cationic repeating units have an anionic counter ion, these groups are still taken into account when calculating the molar fraction of the cationic group.

In an embodiment of the present invention, the anionic group is present in the polymer in a larger molar fraction, the molar fraction of the cationic group is represented by x, the molar fraction of the anionic group is represented by y, and the molar fraction of the anionic group including a counter ion is represented by y-m. In some embodiments, when n of $Z^{'-n}$ is 1, x, y and m may satisfy the following: $x<y$, $m=x$, $0.05 \leq x < 0.5$, $0.5 < y \leq 0.95$, and $x+y=1$, for example, $0.2 \leq x < 0.4$, $0.6 < y \leq 0.8$, or $0.25 \leq x < 0.35$, $0.65 < y \leq 0.75$.

In some embodiments, when n of $Z^{'-n}$ is 1, x, y and m may satisfy the following: $x<y$, $m=x$, $0.05 \leq x < 0.5$, $0.5 < y \leq 0.95$, and $x+y=1$, for example $0.2 \leq x < 0.4$, $0.6 < y \leq 0.8$, or $0.25 \leq x < 0.35$, $0.65 < y \leq 0.75$.

In other embodiments, when n of $Z^{'-n}$ is 2, x, y and m satisfy the following: $x<2y$, $m=0.5x$, $0.05 \leq x \leq 0.5$, $0.25 < y \leq 0.475$, and $0.525 \leq x+y < 0.75$, for example $0.2 \leq x < 0.4$, $0.3 < y \leq 0.4$, or $0.25 \leq x < 0.35$, $0.325 < y \leq 0.375$.

In an embodiment of the present invention, the anionic group is present in the polymer in a larger molar fraction, the molar fraction of the cationic group is represented by x, the molar fraction of the anionic group is represented by y, the molar fraction of the anionic group including a counter ion is y-m, and the molar fraction of the neutral (i.e., non-ionic) group is represented by z.

In some embodiments, when n of $Z^{'-n}$ is 1, x, y, z and m satisfy the following: $x<y$, $m=x$, $0.05 \leq x < 0.50$, $0.25 < y \leq 0.94$, $0.01 \leq z \leq 0.5$, and $x+y+z=1$, for example $0.15 \leq x < 0.40$, $0.35 \leq y < 0.84$ and $0.05 \leq z \leq 0.3$, or $0.25 \leq x < 0.35$, $0.45 \leq y < 0.75$ and $0.05 \leq z \leq 0.2$.

In other embodiments, when n of $Z^{'-n}$ is 2, x, y, z and m satisfy the following: $x<2y$, $m=0.5x$, $0.05 \leq x < 0.50$, $0.125 < y \leq 0.47$, and $0.01 \leq z \leq 0.5$, for example, $0.15 \leq x < 0.40$, $0.175 \leq y < 0.42$ and $0.05 \leq z \leq 0.3$, for example, $0.25 \leq x < 0.35$, $0.225 \leq y < 0.375$ and $0.05 \leq z \leq 0.2$.

In some embodiments of the present invention, the cationic group is present in the polymer in a larger molar fraction, the molar fraction of the cationic group is represented by x, the molar fraction of the anionic group is represented by y, and the molar fraction of the cationic group including a counter ion is x-m.

In some embodiments, when n of $Z^{'-n}$ is 1, x, y and m satisfy the following: $x>y$, $m=y$, $0.5 < x \leq 0.95$, $0.05 \leq y < 0.5$, and $x+y=1$, for example $0.2 \leq y < 0.4$, $0.6 < x \leq 0.8$, or $0.25 \leq y < 0.35$, $0.65 < x \leq 0.75$.

In other embodiments, when n of $Z^{'-n}$ is 2, x, y and m satisfy the following: $x>y$, $m=2y$, $0.5 < x \leq 0.95$, $0.025 \leq y < 0.25$, and $0.75 < x+y \leq 0.975$, for example $0.05 \leq y < 0.2$, $0.6 < x \leq 0.8$, or $0.125 \leq y < 0.175$, $0.65 < x \leq 0.75$.

In an embodiment of the present invention, the cationic group is present in the polymer in a larger molar fraction, the molar fraction of the cationic group is represented by x, the molar fraction of the anionic group is represented by y, the molar fraction of the cationic group including a counter ion is represented by x-m, and the molar fraction of the neutral (i.e., non-ionic) group is z.

In some embodiments, when n of is 1, x, y, z and m satisfy the following: x>y, m=y, $0.25<x\leq0.94$, $0.05\leq y<0.5$, $0.01\leq z\leq0.5$, and x+y+z=1, for example $0.15\leq y<0.45$, $0.30\leq x<0.74$ and $0.05\leq z\leq0.3$, or $0.35\leq y<0.45$, $0.40\leq x<0.60$ and $0.05\leq z\leq0.2$.

In other embodiments, when n of $Z'^{-n}$ is 2, x, y, z and m satisfy the following: x>y, m=2y, $0.25<x\leq0.94$, $0.025\leq y<0.125$, and $0.01\leq z\leq0.5$, for example $0.075\leq y<0.225$, $0.30\leq x<0.74$ and $0.05\leq z\leq0.3$, or $0.175\leq y<0.225$, $0.40\leq x<0.60$ and $0.05\leq z\leq0.2$.

In an embodiment of the present invention, the cationic group is present in the polymer in a larger molar fraction, the molar fraction of the cationic group is represented by x, the molar fraction of the anionic group is represented by y and z, the molar fraction of the cationic group including a counter ion is x-m, and $0.5<x\leq0.95$, for example $0.55<x\leq0.85$, or $0.6<x\leq0.8$.

In some embodiments, when n of $Z'^{-n}$ (in the y group) is 1 and n of $Z'^{-n}$ (of the z group) is 1, m, y and z may satisfy the following: m=y+z, and $0.05\leq y+z\leq0.5$, for example $0.2\leq y+z\leq0.45$.

In other embodiments, when n of $Z'^{-n}$ (in the y group) is 1 and n of $Z'^{-n}$ (in the z group) is 2, y, z and m may satisfy the following: m=y+2z, and $0.05\leq y+2z\leq0.5$, for example $0.2\leq y+z\leq0.45$.

In some embodiments, when n of $Z'^{-n}$ (in the y group) is 2 and n of $Z'^{-n}$ (in the z group) is 1, y, z and m may satisfy the following: m=2y+z, and $0.05\leq 2y+z\leq0.5$, for example $0.2\leq y+z\leq0.45$.

In other embodiments, when n of $Z'^{-n}$ (in the y group) is 2 and n of $Z'^{-n}$ (in the z group) is 2, y, z and m satisfy the following: m=2y+2z, and $0.05\leq 2y+2z\leq0.5$, for example $0.2\leq y+z\leq0.45$.

In an embodiment of the present invention, the anionic group and the cationic group are present in the polymer in generally equal molar fractions, the molar fraction of the cationic group is x, and the molar fraction of the anionic group is y. When n of $Z'^{-n}$ is 1, x=0.5 and y=0.5. When n of $Z'^{-n}$ is 2, x=0.5 and y=0.25.

Alternatively, the anionic group and the cationic group are present in the polymer in generally equal molar fractions, the molar fraction of the cationic group is x, the molar fraction of the anionic group is y, and the molar fraction of the neutral (i.e., non-ionic) group is z.

When n of $Z'^{-n}$ is 1, x, y and z satisfy the following: x=y, $0.25<x\leq0.495$, $0.25\leq y<0.495$, $0.01\leq z\leq0.5$, and x+y+z=1, for example $0.35\leq x<0.45$, $0.35\leq y<0.45$ and $0.1\leq z\leq0.3$.

When n of $Z'^{-n}$ is 2, x, y and z satisfy the following: $0.25<x\leq0.495$, $0.125\leq y<0.2475$ and $0.01\leq z\leq0.5$, preferably $0.35\leq x<0.45$, $0.175\leq y<0.225$ and $0.1\leq z\leq0.3$.

In an embodiment of the present invention, in a polymer including the first repeating unit represented by Formula 3 and the second repeating unit represented by Formula 4, when the molar fraction of the first repeating unit is greater than the molar fraction of the second repeating unit, the polymer may include a first repeating unit represented by Formula 5 below.

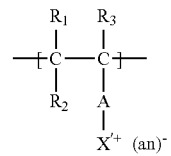

Formula 5

In Formula 5, X', $R_1$ to $R_3$, and A are as defined above with respect to Formula 3, and (an)– is as defined above with respect to Chemical structure 1.

In an embodiment of the present invention, in a polymer including the first repeating unit represented by Formula 1 and the second repeating unit represented by Formula 4, and a polymer including the first repeating unit represented by Formula 3 and the second repeating unit represented by Formula 4, when the molar fraction of the first repeating unit is smaller than the molar fraction of the second repeating unit, the polymers may further include a second repeating unit represented by Formula 6 below:

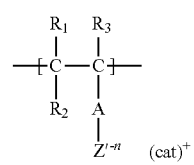

Formula 6

$R_1$ to $R_3$, A, Z' and n in Formula 6 are as defined above with respect to Formula 4, and (cat)$^+$ is as defined above with respect to Chemical structure 6.

In an embodiment of the present invention, in a polymer including the first repeating unit represented by Formula 1 and the second repeating unit represented by Formula 4, when the molar fraction of the first repeating unit is greater than the molar fraction of the second repeating unit, the polymer may include a first repeating unit represented by Formula 7(a) or 7(b) below.

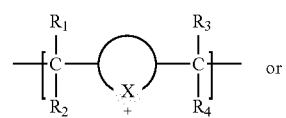

Formula 7(a)

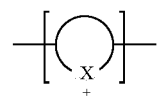

Formula 7(b)

The (an)$^-$ counter ion is not shown in either of Formulae 7(a) and 7(b).

In Formulae 7(a) and 7(b),

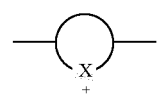

and $R_1$-$R_4$ are as defined above with respect to Formula 1, and (an)$^-$ is as defined above with respect to Chemical structure 1.

In an embodiment of the present invention, the first repeating unit of the polymer may include a combination of the ring structure of Formula 1 and the non-ring structure of Formula 3. In this regard, a mixed mole ratio of the first repeating unit represented by Formula 1 and the first repeating unit represented by Formula 3 may be 5:95 to 95:5.

The following Formulae 8 through 44 are pictorial representations of exemplary polymers according to embodiments of the present invention. However, these representations are presented for illustrative purposes only, for example, to depict the molar fraction relationships of the different repeating units in the disclosed polymers. As such, the pictorial representations in Formulae 8 through 44 do not limit the polymers to the depicted monomer bonding order. Instead, the polymers according to embodiments of the present invention may have any copolymeric structure. For example, in some embodiments of the present invention, the polymers may be alternating copolymers, statistical copolymers, random copolymers or block copolymers. In some exemplary embodiments of the present invention, the polymers are random copolymers.

Hereinafter, exemplary polymers according to embodiments of the present invention are depicted in Formulae 8 through 13. However, the depicted polymers are examples only, and the present invention is not limited to the depicted structures.

In Formulae 8 through 13, x, y, z, h, and m represent molar fractions of the depicted repeating units. The degree of polymerization of the polymers is not shown in the formulae, but may be about 100 to about 10,000. In an embodiment of the present invention, the polymers may have a weight average molecular weight of about 5,000 to about 1,000,000 g/mol.

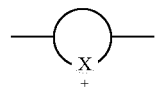

refers to a 3-membered or 31-membered ring having from 2 to 30 carbon atoms and at least one hetero atom.

(an)$^-$ is as defined above with respect to Chemical structure 1.

A represents a simple chemical bond, or any one of a C1-C30 (for example, C1-C10 or C3-C5) alkyl, a C6-C30 (for example, C6-C10) aryl, a C7-C30 (for example, C8-C11) arylalkyl, a C1-C30 (for example, C4-C9) heteroaryl, a C4-C30 (for example, C5-C10) cycloalkyl group, or a C1-C30 (for example, C4-C9) heterocycloalkyl group. These groups may be unsubstituted or may be substituted with at least one group selected from carbonyl groups (—CO—), oxy groups (—O—), carbonyloxy groups (—COO— or —OCO—), iminocarbonyl groups (—NH—CO— or —CO—NH—), iminosulfonyl groups (—NH—SO$_2$— or —SO$_2$—NH—), sulfanyl groups (—S—), sulfinyl groups (—S(O)—), sulfonyl groups (—SO$_2$—), sulfonyloxy groups (—SO$_2$—O— or —O—SO$_2$—), imino groups (—NH—), methylene repeating units (—(CH$_2$O)$_n$—, n=1 to 20), methyleneoxide repeating units (—(CH$_2$O)$_n$—, n=1 to 20), ethyleneoxide repeating units (—(CH$_2$CH$_2$O)$_n$—, n=1 to 20), or propyleneoxide repeating units (—(CH(CH$_3$)CH$_2$O)$_n$, n=1 to 20).

Z' may be a carboxylate group (—C(=O)O), a sulfate group (—OS(=O)$_2$O), a sulfite group (—OS(=O)O), a sulfinate group (—S(=O)O), a phosphate group (—OP(=O)(O)$_2$), or a phosphonate group (—P(=O)(O)$_2$).

n is 1 or 2.

Formula 8(a) and 8(b) depict polymers in which the molar fraction of the cationic group is greater than the molar fraction of the anionic group. When n of Z$^{\prime -n}$ is 1, the molar fractions of the different repeating units satisfy the following: x>y, m=y, 0.5<x≤0.95, 0.05≤y<0.5, and x+y=1, for example 0.2≤y≤0.4, 0.6<x≤0.8. When n of Z$^{\prime -n}$ is 2, the molar fractions satisfy the following: x>y, m=2y, 0.5<x≤0.95, 0.025≤y<0.25, and 0.75<x+y≤0.975, for example 0.05≤y<0.2, 0.6<x≤0.8, or 0.125≤y<0.175, 0.65<x≤0.75.

Formula 8(a)

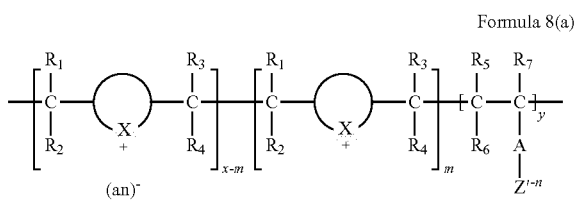

Formula 8(b)

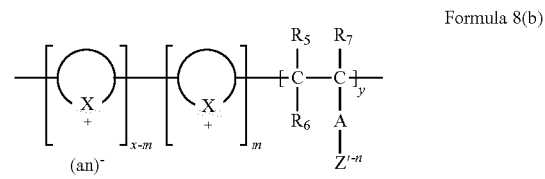

In Formula 8(a) and 8(b), R$_1$ to R$_7$ are each independently hydrogen, a unsubstituted or substituted C1-C30 (for example, C1-C10 or C3-C5) alkyl group, a unsubstituted or substituted C1-C30 (for example, C1-C10 or C3-C5) alkoxy group, a unsubstituted or substituted C6-C30 (for example, C6-C10) aryl group, unsubstituted or substituted C7-C30 (for example, C8-C11) arylalkyl, a unsubstituted or substituted C6-C30 (for example, C6-C10) aryloxy group, a unsubstituted or substituted C3-C30 (for example, C4-C9) heteroaryl group, a unsubstituted or substituted C3-C30 (for example, C4-C9) heteroaryloxy group, a unsubstituted or substituted C4-C30 (for example, C5-C10) cycloalkyl group, or a unsubstituted or substituted C3-C30 (for example, C4-C9) heterocycloalkyl group.

Formula 9(a)

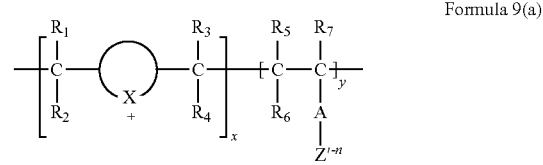

Formula 9(b)

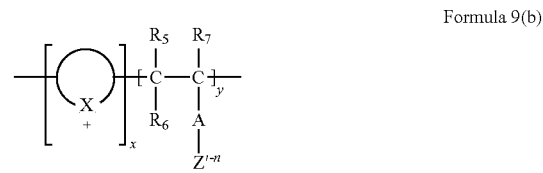

In Formulae 9(a) and 9(b),

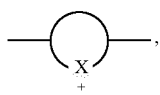

$R_1$-$R_7$ and A, Z', and n are as defined above with respect to Formulae 8(a) and 8(b). Formulae 9(a) and 9(b) depict polymers in which the molar fraction of the cationic group is the same as the molar fraction of the anionic group. When n of $Z'^{-n}$ is 1, x=0.5 and y=0.5. When n of $Z'^{-n}$ is 2, x=0.5 and y=0.25.

Formula 10(a)

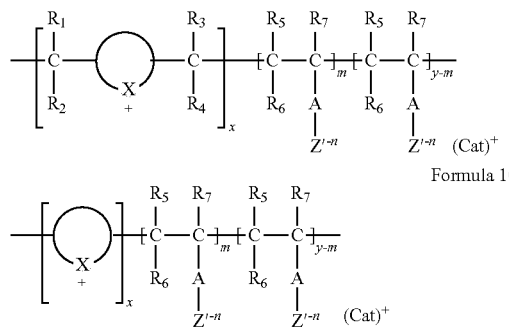

Formula 10(b)

In Formulae 10(a) and 10(b),

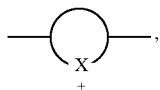

$R_1$-$R_7$, A, Z', and n are as defined above with respect to Formula 8(a) and 8(b). Formulae 10(a) and 10(b) depict polymers in which the molar fraction of the cationic group is smaller than the molar fraction of the anionic group. When n of Z'-n is 1, the molar fractions of the repeating units satisfy the following: x<y, m=x, 0.05≤x<0.5, 0.5<y≤0.95, and x+y=1, for example 0.2≤x<0.4, 0.6<y≤0.8, or 0.25≤x<0.35, 0.65<y≤0.75. $Z'^{-n}$ is 2, the molar fractions satisfy the following: x<y, m=0.5x, 0.05<x≤0.5, 0.25<y≤0.475, and 0.525≤x+y<0.75, for example 0.2≤x<0.4, 0.3<y≤0.4, or 0.25≤x<0.35, 0.325<y≤0.375. In Formulae 10(a) and 10(b), $(cat)^+$ is as defined above with respect to Chemical structure 6.

Formula 11

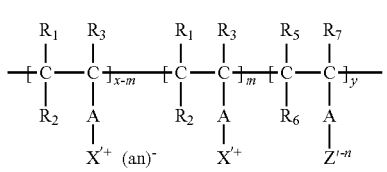

In Formula 11, $R_1$-$R_3$, $R_5$-$R_7$, Z', n, and (an)⁻ are as defined above with respect to Formulae 8(a) and 8(b), and A and X' are as defined above with respect to Formula 3.

Formula 11 depicts a polymer in which the molar fraction of the cationic group is greater than the molar fraction of the anionic group. When n of $Z'^{-n}$ is 1, the molar fractions of the repeating units satisfy the following: x>y, m=y, 0.5<x≤0.95, 0.05≤y<0.5, and x+y=1, for example 0.2≤y<0.4, 0.6<x≤0.8, or 0.25≤y<0.35, 0.65<x≤0.75. When n of $Z'^{-n}$ is 2, the molar fractions satisfy the following: x>y, m=2y, 0.5<x≤0.95, 0.025≤y<0.25, and 0.75<x+y≤0.975, for example 0.05≤y<0.2, 0.6<x≤0.8, or 0.125≤y<0.175, 0.65<x≤0.75.

Formula 12

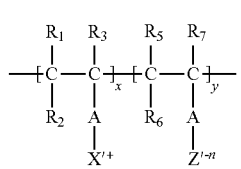

In Formula 12, X', $R_1$-$R_3$, $R_5$-$R_7$, A, Z', and n are as defined above with respect to Formula 11.

Formula 12 depicts a polymer in which the molar fraction of the cationic group is the same as the molar fraction of the anionic group. When n of $Z'^{-n}$ is 1, x=0.5 and y=0.5. When n of $Z'^{-n}$ is 2, x=0.5 and y=0.25.

Formula 13

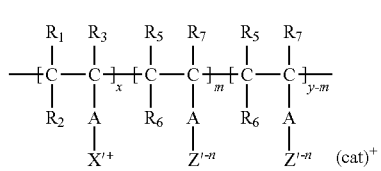

In Formula 13, X', $R_1$-$R_3$, $R_5$-$R_7$, Z', n, and A are as defined above with respect to Formula 11. Formula 13 depicts a polymer in which the molar fraction of the cationic group is smaller than the molar fraction of the anionic group. When n of $Z'^{-n}$ is 1, the molar fractions of the repeating units satisfy the following: x<y, m=x, 0.05≤x<0.5, 0.5<y≤0.95, and x+y=1, for example 0.2≤x<0.4, 0.6<y≤0.8, or 0.25≤x<0.35, 0.65<y≤0.75. When n of $Z'^{-n}$ is 2, the molar fractions satisfy the following: x<2y, m=0.5x, 0.05<x≤0.5, 0.25<y≤0.475, and 0.525≤x+y<0.75, for example 0.2≤x<0.4, 0.3<y≤0.4, or 0.25≤x<0.35, 0.325<y≤0.375. In Formula 13, $(cat)^+$ is as defined above with respect to Chemical Structure 6.

According to an embodiment of the present invention, the polymer may be represented by one of Formulae 14 to 22 below.

Formula 14

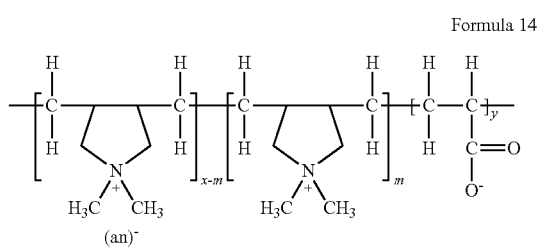

In Formula 14, (an)⁻ is as defined above with respect to Formula 8(a) and 8(b). Formula 14 depicts a polymer in which the molar fraction of the cationic group is greater than the molar fraction of the anionic group and in which n of $Z'^{-n}$ is 1. As such, the molar fractions of the repeating units satisfy the following: x>y, m=y, 0.5<x≤0.95, 0.05≤y<0.5, and x+y=1, for example 0.2≤y<0.4, 0.6<x≤0.8, or 0.25≤y<0.35, 0.65<x≤0.75.

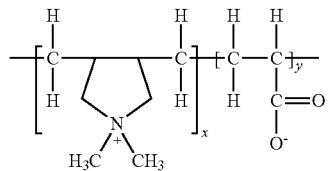

Formula 15

Formula 15 depicts a polymer in which the molar fraction of the cationic group is the same as the molar fraction of the anionic group, and in which n of $Z'^{-n}$ is 1. Accordingly, x=0.5 and y=0.5.

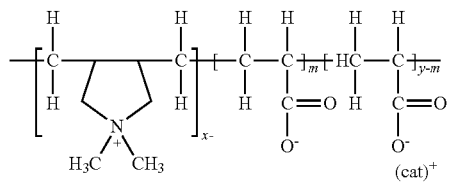

Formula 16

In Formula 16, $(cat)^+$ is as defined above with respect to Formulae 10(a) and 10(b). Formula 16 depicts a polymer in which the molar fraction of the cationic group is smaller than the molar fraction of the anionic group, and in which n of $Z'^{-n}$ is 1. Accordingly, the molar fractions of the repeating units satisfy the following: x<y, m=x, 0.05<x≤0.5, 0.5≤y<0.95, and x+y=1, for example 0.2≤y<0.4, 0.6<x≤0.8, or 0.25≤y<0.35, 0.65<x≤0.75.

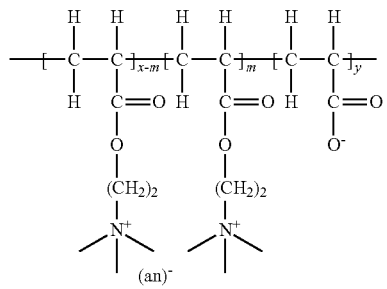

Formula 17

In Formula 17, $(an)^-$ is as defined above with respect to Formulae 8(a) and 8(b). Formula 17 depicts a polymer in which the molar fraction of the cationic group is greater than the molar fraction of the anionic group, and in which n of $Z'^{-n}$ is 1. As such, the molar fractions of the repeating units satisfy the following: x>y, m=x, 0.5<x≤0.95, 0.05≤y<0.5, and x+y=1, for example 0.2≤y<0.4, 0.6<x≤0.8, or 0.25≤y<0.35, 0.65<x≤0.75.

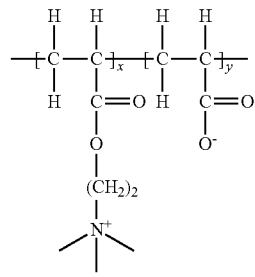

Formula 18

Formula 18 depicts a polymer in which the molar fraction of the cationic group is the same as the molar fraction of the anionic group, and in which n of $Z'^{-n}$ is 1. Accordingly, x=0.5 and y=0.5.

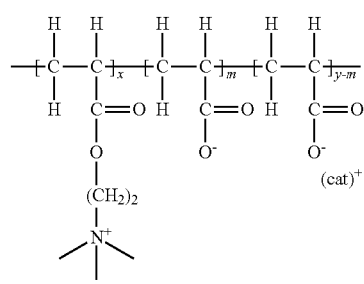

Formula 19

In Formula 19, $(cat)^+$ is as defined above with respect to Formulae 10(a) and 10(b). Formula 19 depicts a polymer in which the molar fraction of the cationic group is smaller than the molar fraction of the anionic group, and in which n of $Z'^{-n}$ is 1. As such, the molar fractions of the repeating units satisfy the following: x<y, m=x, 0.05<x≤0.5, 0.5≤y<0.95, and x+y=1, for example 0.2≤x<0.4, 0.6<y≤0.8, or 0.25≤x<0.35, 0.65<y≤0.75.

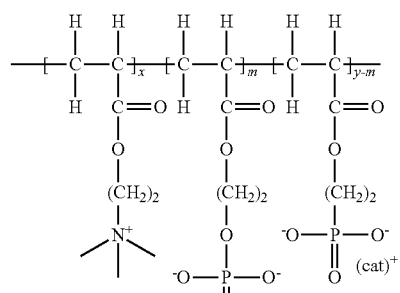

Formula 20

In Formula 20, $(cat)^+$ is as defined above with respect to Formulae 10(a) and 10(b). Formula 20 depicts a polymer in which the molar fraction of the cationic group is smaller than the molar fraction of the anionic group, and in which n of $Z'^{-n}$ is 2. Accordingly, the molar fractions of the repeating units satisfy the following: m=2x, 0.05<x≤0.5, 0.25<y≤0.475, 0.525≤x+y<0.75, for example 0.2≤x<0.4, 0.3<y≤0.4, or 0.25≤x<0.35, 0.325<y≤0.375. Formula 20 is presented here in an effort to further the understanding of the invention. However, due to the difference between the primary and secondary ionization degrees of the phosphate groups, the polymer of Formula 20 may alternatively be depicted by Formula 21, below.

Formula 21

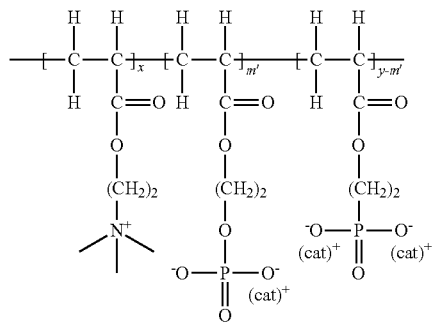

In Formula 21, m' is a value determined by the degree of primary and secondary ionization of the phosphate groups, and may have a value similar to m in Formula 20.

Formula 22

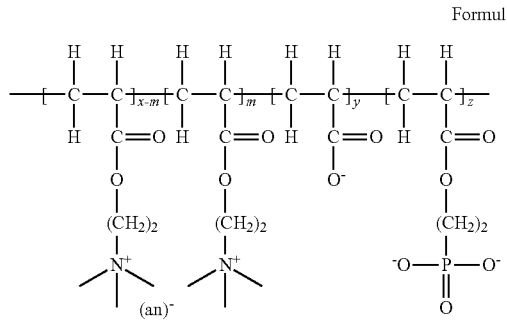

In Formula 22, (an)⁻ is as defined above with respect to Formulae 8(a) and 8(b). Formula 22 depicts a polymer in which the molar fraction of the cationic group is greater than the molar fraction of the anionic group, and in which n of $Z'^{-n}$ is 1 or 2. Accordingly, the molar fractions of the repeating units satisfy the following: x>y, m=y+2z, 0.5<x≤0.95, 0.05≤y+2z<0.5, and x+y+2z=1, for example 0.55<x≤0.85, or 0.6<x≤0.8, and 0.05≤y+2z<0.5, or 0.2≤y+z≤0.45.

The polymer according to embodiments of the present invention may further include a non-ionic third repeating unit. As the non-ionic third repeating unit, a third repeating unit represented by Formula 23 may be used.

Hereinafter, exemplary polymers having the third repeating unit of Formula 23 according to embodiments of the present invention are depicted in Formulae 24 through 29. However, the depicted polymers are examples only, and the present invention is not limited to the depicted structures.

Formulae 24 through 29 do not show a degree of polymerization. However, in some embodiments of the present invention, the degree of polymerization of the polymers is 100 to 10,000. In some embodiments of the present invention, a weight average molecular weight of the polymers may be about 5,000 to about 1,000,000 g/mol. In some embodiments of the present invention, a viscosity of an aqueous solution of the polymer prepared by dissolving 5 wt % solids content in pure water is 1,000 to 1,000,000 cP.

Formula 24(a)

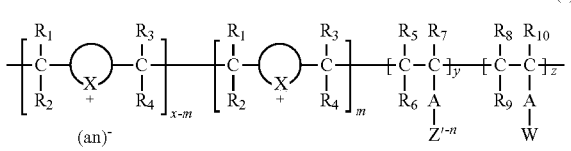

Formula 24(b)

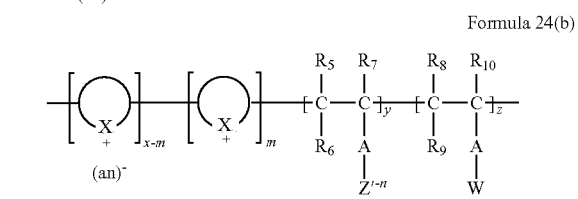

In Formulae 24(a) and 24(b), $R_1$ to $R_{10}$ are each independently hydrogen, a unsubstituted or C1-C30 (for example, C1-C10 or C3-C5) alkyl group, a unsubstituted or substituted C1-C30 (for example, C1-C10 or C3-C5) alkoxy group, a unsubstituted or substituted C6-C30 (for example, C6-C10) aryl group, unsubstituted or substituted C7-C30 (for example, C8-C11) arylalkyl, a unsubstituted or substituted C6-C30 (for example, C6-C10) aryloxy group, a unsubstituted or substituted C3-C30 (for example, C4-C9) heteroaryl group, a unsubstituted or substituted C3-C30 (for example, C4-C9) heteroaryloxy group, a unsubstituted or substituted C4-C30 (for example, C5-C10) cycloalkyl group, or a unsubstituted or substituted C3-C30 (for example, C4-C9) heterocycloalkyl group.

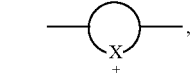

Z', n, A, and (an)⁻ are as defined above with respect to Formulae 8(a) and 8(b). $R_8$-$R_{10}$, A, and W of the repeating unit with a mole fraction represented by z are as defined above with respect to Formula 23.

Formulae 24(a) and 24(b) depicts a polymer in which the molar fraction of the cationic group is greater than the molar fraction of the anionic group. When n of $Z'^{-n}$ is 1, the molar fractions of the repeating units satisfy the following: x>y, m=y, 0.25<x≤0.94, 0.05≤y<0.5, 0.01≤z≤0.5, and x+y+z=1, for example 0.15≤y<0.45, 0.30≤x<0.74 and 0.05≤z≤0.3, or 0.35≤y<0.45, 0.40≤x<0.60 and 0.05≤z≤0.2.

Formula 25(a)

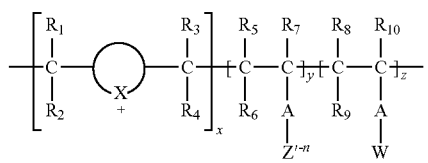

Formula 25(b)

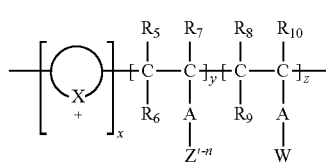

In Formulae 25(a) and 25(b),

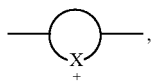

$R_1$-$R_{10}$, A, Z', W, and n are as defined above with respect to Formulae 24(a) and 24(b).

Formulae 25(a) and 25(b) depict polymers in which the molar fraction of the cationic group is the same as the molar fraction of the anionic group. When n of $Z'^{-n}$ is 1, the molar fractions of the repeating units satisfy the following: x=y, $0.25<x\le0.495$, $0.25\le y<0.495$, $0.01\le z\le0.5$, and x+y+z=1, for example $0.35\le x<0.45$, $0.35\le y<0.45$ and $0.1\le z\le0.3$.

Formula 26(a)

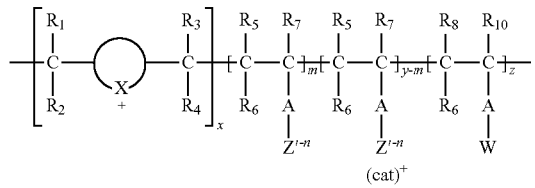

Formula 26(b)

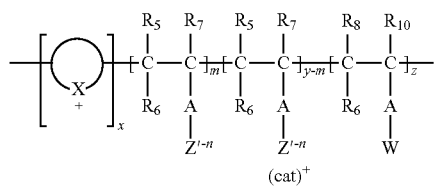

In Formulae 26(a) and 26(b),

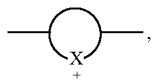

$R_1$-$R_{10}$, W, Z', n, and A are as defined above with respect to Formulae 24(a) and 24(b), and $(cat)^+$ is as defined above with respect to Formulae 10(a) and 10(b).

Formulae 26(a) and 26(b) depict polymers in which the molar fraction of the cationic group is smaller than the molar fraction of the anionic group. When n of $Z'^{-n}$ is 1, molar fractions of the repeating units satisfy the following: x<y, m=x, $0.05\le x<0.5$, $0.25<y\le0.94$, $0.01\le z\le0.5$, and x+y+z=1, for example $0.15<x\le0.35$, $0.5\le y<0.8$, $0.05\le z\le0.2$.

Formula 27

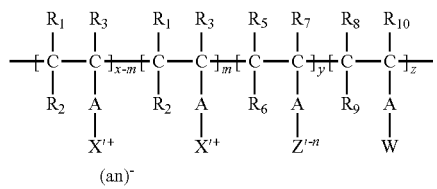

In Formula 27, $R_1$-$R_3$, $R_5$-$R_{10}$, W, A, n, and Z are as defined above with respect to Formulae 26(a) and 26(b), and X' and $(an)^-$ are as defined above with respect to Formula 11.

Formula 27 depicts a polymer in which the molar fraction of the cationic group is greater than the molar fraction of the anionic group. When n of $Z'^{-n}$ is 1, the molar fractions of the repeating units satisfy the following: x>y, m=y, $0.25<x\le0.94$, $0.05\le y<0.5$, $0.01\le z\le0.5$, and x+y+z=1, for example $0.35<x\le0.74$, $0.10\le y<0.30$, $0.05\le z\le0.2$.

Formula 28

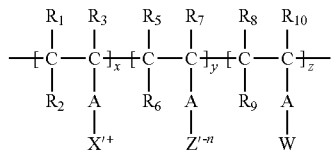

In Formula 28, X', $R_1$-$R_3$, $R_5$-$R_{10}$, Z', A, W, and n are as defined above with respect to Formula 27.

Formula 28 depicts a polymer in which the molar fraction of the cationic group is the same as the molar fraction of the anionic group. When n of $Z'^{-n}$ is 1, the molar fractions of the repeating units satisfy the following: x=y, $0.25<x\le0.495$, $0.25\le y<0.495$, $0.01\le z\le0.5$, and x+y+z=1, for example $0.35\le x<0.45$, $0.35\le y<0.45$ and $0.1\le z\le0.3$.

Formula 29

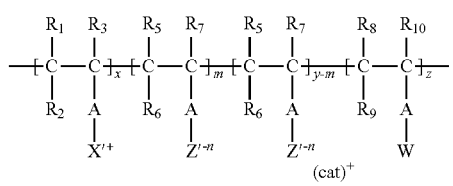

In Formula 29, X', Z', W, n, A, $R_1$-$R_3$, and $R_5$-$R_{10}$ are as defined above with respect to Formula 27, and $(cat)^+$ is as defined above with respect to Formulae 10(a) and 10(b).

Formula 29 depicts a polymer in which the molar fraction of the cationic group is smaller than the molar fraction of the anionic group. When n of $Z'^{-n}$ is 1, the molar fractions of the repeating units satisfy the following: x<y, m=x, $0.05\ x<0.5$, $0.25<y\le0.94$, $0.01\le z\le0.5$, and x+y+z=1, for example $0.15<x\le0.35$, $0.5\le y<0.8$, $0.05\le z\le0.2$.

Nonlimiting examples of the polymer include those represented by Formulae 30 through 35 below. Formulae 30 through 35 do not depict the degree of polymerization. However, in embodiments of the present invention, the degree of polymerization of the polymers may be about 100 to about 10,000. In some embodiments of the present invention, the weight average molecular weight of the polymers may be about 5,000 to about 1,000,000.

Formula 30(a)

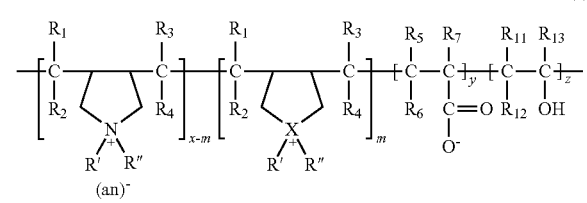

Formula 30(b)

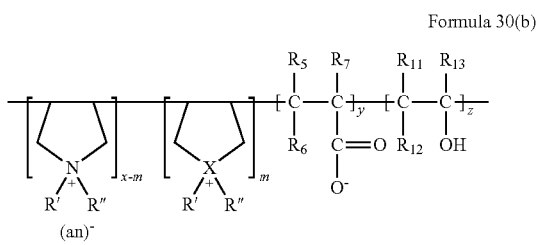

In Formulae 30(a) and 30(b), $R_1$-$R_7$, and $R_{11}$-$R_{13}$ are each independently hydrogen, a C1-C30 (for example, C1-C10 or C3-C5) alkyl group, a C6-C30 (for example, C6-C10) aryl group, a C3-C30 (for example, C4-C9) heteroaryl group, a C4-C30 (for example, C5-C10) cycloalkyl group, or a C3-C30 (for example, C4-C9) heterocycloalkyl group, R', and R" are each independently hydrogen, a C1-C30 (for example, C1-C10 or C3-C5) alkyl, a C6-C30 (for example, C6-C10) aryl, a C7-C30 (for example, C8-C11) arylalkyl, a C1-C30 (for example, C4-C9) heteroaryl, a C4-C30 (for example, C5-C10) cycloalkyl, or a C1-C30 (for example, C4-C9) heterocycloalkyl. These groups may be unsubstituted or substituted with at least one substituent selected from carbonyl groups (—CO—), oxy groups (—O—), carbonyloxy groups (—COO⁻ or —OCO⁻), iminocarbonyl groups (—NH—CO⁻ or —CO⁻NH—), iminosulfonyl groups (—NH—SO₂— or —SO₂—NH—), sulfanyl groups (—S—), sulfinyl groups (—S(O)—), sulfonyl groups (—SO2-), sulfonyloxy groups (—SO₂—O— or —O—SO₂—), and imino groups (—NH—).

(an)⁻ is as defined above with respect to Chemical Structure 1, and may be HCOO⁻, CH₃COO⁻, CF₃COO⁻, CH₃CH₂COO⁻, COO²⁻, HOC(CH₂COO—)₂COO—, CH₃(CH₂)₁₆COO—, CO₃⁻², HCO₃⁻, Cl⁻, Br⁻, I⁻, SO₄⁻², HSO₄⁻, NO₃⁻, PO₄⁻³, HPO₃⁻², H₂PO₃⁻, SO₃⁻², HSO₃⁻, NO₂⁻, P₂O₇⁻⁴, BX₄⁻ (where X is a halogen atom), AlX₄⁻ (where X is a halogen atom), PX₆⁻ (where X is a halogen atom), AsX⁻ (where X is a halogen atom), ClO⁻, CH₃SO₃⁻, CF₃SO₃⁻, CH₃CH₂SO₃⁻, or N(CF₃SO₃)₂⁻.

Formulae 30(a) and 30 (b) depict polymers in which the molar fraction of the cationic group is greater than the molar fraction of the anionic group. The molar fractions of the repeating units satisfy the following: x>y, m=y, 0.25<x≤0.94, 0.05≤y<0.5, 0.01≤z≤0.5, and x+y+z=1, for example 0.15≤y<0.45, 0.30≤x<0.74 and 0.05≤z≤0.3, or 0.35≤y<0.45, 0.40≤x<0.60 and 0.05≤z<0.2.

Formula 31(a)

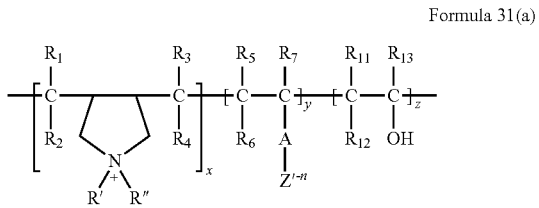

Formula 31(b)

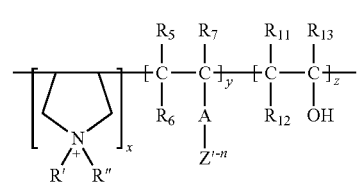

In Formulae 31(a) and 31(b), $R_1$-$R_4$, $R_5$-$R_7$, $R_{11}$-$R_{13}$, R', and R" are as defined above with respect to Formulae 30(a) and 30(b), and A, Z', and n are as defined above with respect to Formula 29.

Formulae 31(a) and 31(b) depict polymers in which the molar fraction of the cationic group is the same as the molar fraction of the anionic group. The molar fractions of the repeating units satisfy the following: x=y, 0.25≤x≤0.495, 0.25≤y≤0.495, 0.01≤z≤0.5, and x+y+z=1, for example 0.35≤x<0.45, 0.35≤y<0.45 and 0.1≤z≤0.3.

Formula 32

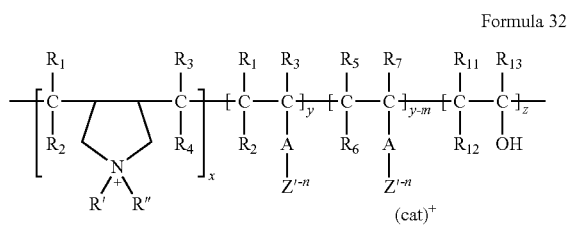

In Formula 32, $R_1$-$R_3$, $R_5$-$R_7$, $R_{11}$-$R_{13}$, R', and R" are as defined above with respect to Formulae 30(a) and 30(b). A, Z', and n are as defined above with respect to Formula 29, and (cat)⁺ is as defined above with respect to Chemical Structure 6.

Formula 32 depicts a polymer in which the molar fraction of the cationic group is smaller than the molar fraction of the anionic group. The molar fractions of the repeating units satisfy the following: x<y, m=y, 0.05≤x<0.5, 0.25<y≤0.94, 0.01≤z≤0.5, and x+y+z=1, for example 0.2≤x<0.4, 0.55<y≤0.84, 0.05≤z≤0.2.

Formula 33

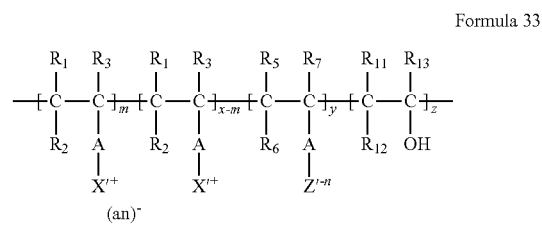

In Formula 33, $R_1$-$R_3$, $R_5$-$R_7$, $R_{11}$-$R_{13}$, R', and R" are as defined above with respect to Formulae 30(a) and 30(b). n, Z', A, and X' are as defined above with respect to Formula 29, and (an)⁻ is as defined above with respect to Formula 27.

Formula 33 depicts a polymer in which the molar fraction of the cationic group is greater than the molar fraction of the anionic group. The molar fractions of the repeating units satisfy the following: x>y, m=y, 0.25<x≤0.94, 0.05≤y<0.5, 0.01≤z≤0.5, and x+y+z=1, for example 0.15≤y<0.45, 0.30≤x<0.74 and 0.05≤z≤0.3, or 0.35≤y<0.45, 0.40≤x<0.60 and 0.05≤z≤0.2.

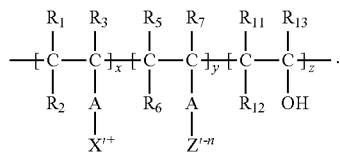

Formula 34

In Formula 34, $R_1$-$R_3$, $R_5$-$R_7$, and $R_{11}$-$R_{13}$ are as defined above with respect to Formulae 30(a) and 30(b). n, Z', A, and X' are as defined above with respect to Formula 29.

Formula 34 depicts a polymer in which the molar fraction of the cationic group is the same as the molar fraction of the anionic group. The molar fractions of the repeating units satisfy the following: x=y, 0.25≤x≤0.495, 0.25≤y≤0.495, 0.01≤z≤0.5, and x+y+z=1, for example 0.35≤x<0.45, 0.35≤y<0.45 and 0.1≤z≤0.3.

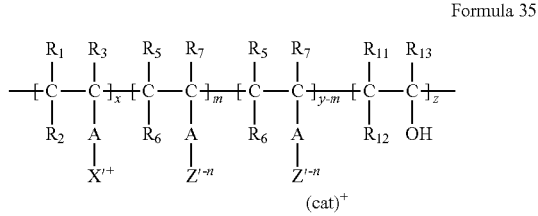

Formula 35

In Formula 35, $R_1$-$R_3$, $R_5$-$R_7$, $R_{11}$-$R_{13}$, X', A, n, and Z' are as defined above with respect to Formula 34, and (cat)$^+$ is as defined above with respect to Formula 32.

Formula 35 depicts a polymer in which the molar fraction of the cationic group is smaller than the molar fraction of the anionic group. The molar fractions of the repeating units satisfy the following: x<y, m=x, 0.05≤x<0.5, 0.25<y≤0.94, 0.01≤z≤0.5, and x+y+z=1, for example 0.15≤x<0.40, 0.35≤y<0.84 and 0.05≤z≤0.3, or 0.25≤x<0.35, 0.45≤y<0.75 and 0.05≤z≤0.2.

Hereinafter, exemplary polymers according to embodiments of the present invention are depicted in Formulae 36 through 44. However, the depicted polymers are examples only, and the present invention is not limited to the depicted structures.

Formulae 36 to 44 do not depict the degree of polymerization. However, in some embodiments of the present invention, the degree of polymerization of the polymers may be about 100 to about 10,000. In some embodiments of the present invention, a weight average molecular weight of the polymers may be about 5,000 to about 1,000,000.

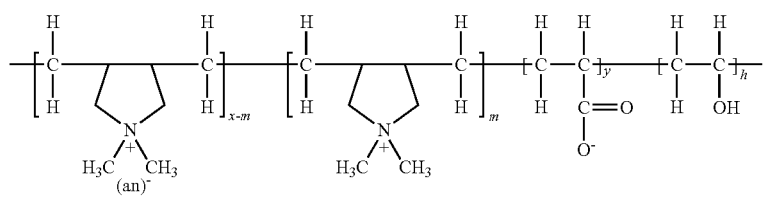

Formula 36(a)

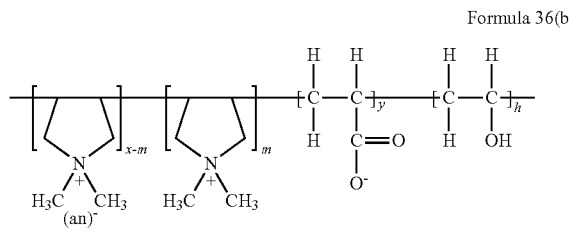

Formula 36(b)

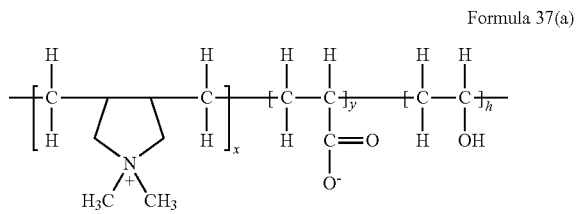

Formula 37(a)

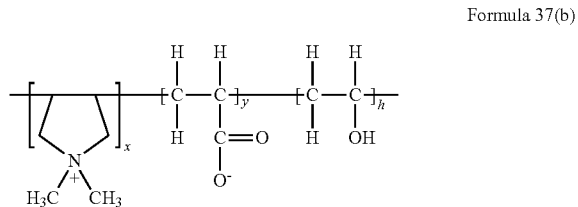

Formula 37(b)

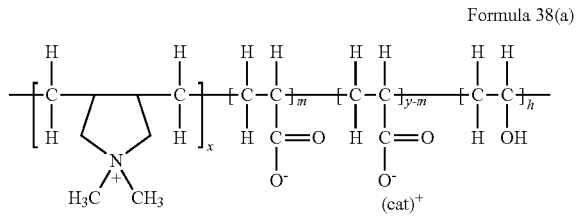

Formula 38(a)

-continued

Formula 38(b)

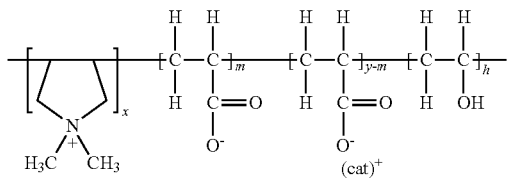

Formula 39

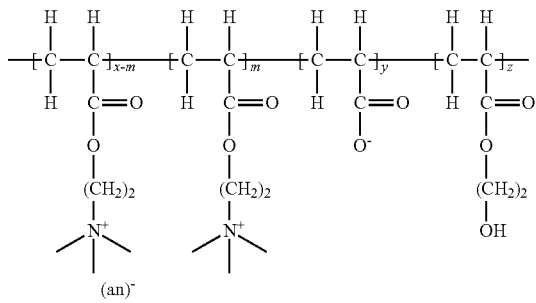

Formula 40

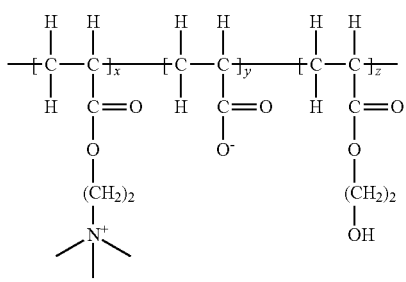

Formula 41

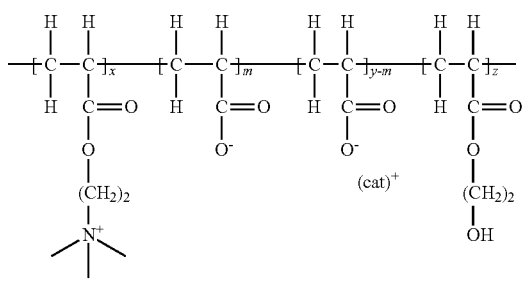

Formula 42

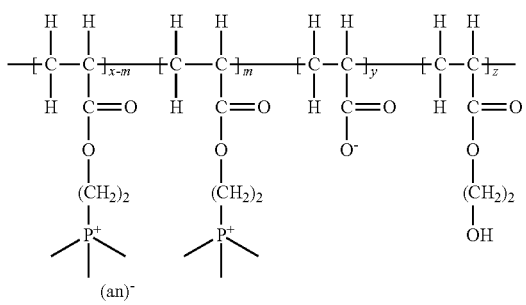

Formula 43

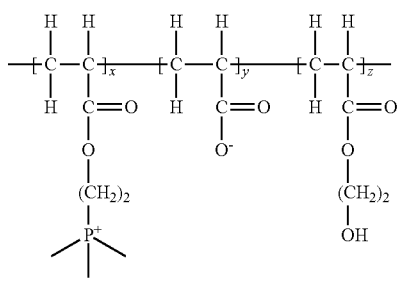

Formula 44

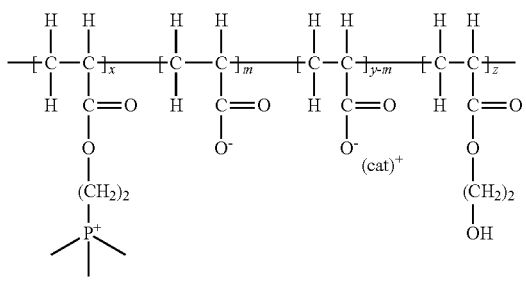

In Formulae 36(a), 36(b), 39 and 42, $x>y$, $m=y$, $0.25<x\leq0.94$, $0.05\leq y<0.50$, $0.01\leq z\leq0.5$, and $x+y+z=1$, for example $0.35<x\leq0.74$, $0.20\leq y<0.45$, $0.05\leq z\leq0.2$.

In Formulae 38(a), 38(b), 41 and 44, $x<y$, $m=x$, $0.05\leq x<0.50$, $0.25<y\leq0.94$, $0.01\leq z\leq0.5$, and $x+y+z=1$, for example $0.20<x\leq0.50$, $0.5\leq y<0.8$, $0.05\leq z\leq0.2$.

In Formulae 37(a), 37(b), 40 and 43, $x=y$, $0.25<x\leq0.495$, $0.25\leq y<0.495$, $0.01\leq z\leq0.5$, and $x+y+z=1$, for example $0.35\leq x<0.45$, $0.35\leq y<0.45$ and $0.1\leq z\leq0.3$.

According to some embodiments of the present invention, the polymer may be represented by one of Formulae 22, 16, 27, 26(b) or 29, described above. For example, in some embodiments, the polymer may be represented by Formula 22(a), Formula 16(a), Formula 27(a), Formula 26(c), or Formula 29(a), below.

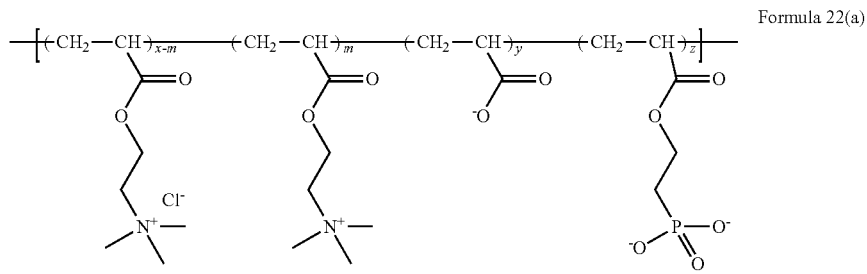

Formula 22(a)

In Formula 22(a), m is 0.4, x is 0.7, y is 0.2, and z is 0.1.

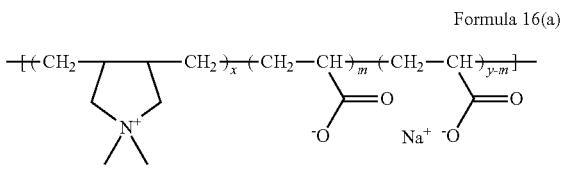

Formula 16(a)

In Formula 16a, x is 0.3, y is 0.7, and m is 0.3.

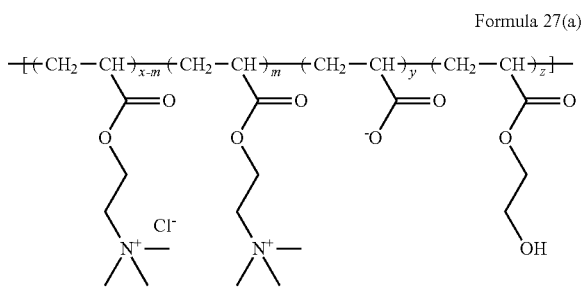

Formula 27(a)

In Formula 27(a), m is 0.4, x is 0.5, y is 0.4, and z is 0.1.

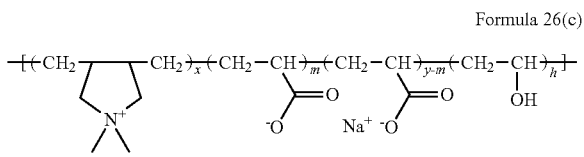

Formula 26(c)

In Formula 26(c), m is 0.3, x is 0.3, y is 0.6, and z is 0.1.

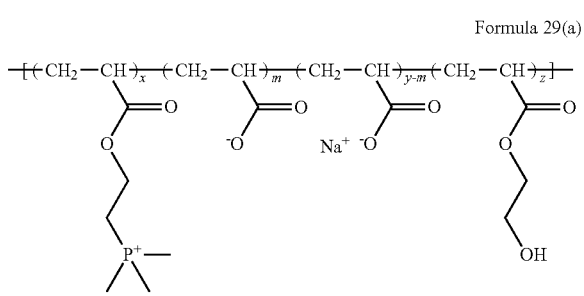

Formula 29(a)

In Formula 29(a), m is 0.3, x is 0.3, y is 0.6, and z is 0.1.

In embodiments of the present invention, the degree of polymerization of the polymers represented by Formula 22(a), Formula 16(a), Formula 27(a), Formula 26(c), and Formula 29(a) may be about 100 to about 10,000. For each of these polymers, the degree of polymerization relates to the number of times the unit encompassed by the brackets (i.e., "[ . . . ]") is repeated.

The polymer according to embodiments of the present invention may further include a functional group in addition to the cationic group and the anionic group. Nonlimiting examples of the functional group include carboxyl groups, hydroxyl groups, amine groups, amide groups, imide groups, nitrile groups, sulfone groups, halogen groups, silane groups, and silicon groups (e.g., siloxane groups and Si(R')(R'')(R''') groups, where R', R'', and R''' may each independently be a C1-C20 alkyl group, a C1-C20 alkoxy group or a halogen atom).

The functional group may be present in the polymer in a molar amount of 0.5 mol or lower based on 1 mole of the cationic group and the anionic group together. For example, the molar amount of the functional group may be 0.01 to 0.5 mol.

According to some embodiments, two or more polymers having the same cationic and anionic groups at the same mole ratio but having different molecular weight distributions may be used in combination.

According to other embodiments, two or more polymers having the same cationic and anionic groups at different mole ratios may be used in combination. Alternatively, two or more polymers having the same cationic groups and different anionic groups may be used in combination.

In embodiments of the present invention, a process for producing the above-described polymers includes: polymerizing a first repeating unit having a cationic group and a second repeating unit having an anionic group; removing the respective counter ions ((an)$^-$ and (cat)$^+$) from the polymer using a solvent to remove (an)(cat) as a salt from the polymer.

In embodiments of the present invention, the solvent may include at least one of methanol, ethanol, formamide, glycerin, propylene glycol, or N-methylpyrrolidone (NMP). Alternatively, the solvent may include at least one diluted solvent selected from the above list of solvents. The diluted solvent may be prepared by diluting the solvent in another solvent (for example, water, acetone, lower alcohol, or the like).

In embodiments of the present invention, hydrolysis may be carried out after polymerization. The hydrolysis may be carried out by any suitable conventional methods. In an exemplary embodiment, basic hydrolysis, for example using NaOH, may be used.

In embodiments of the present invention, the counter ion removal may be carried out by adding between a solvent to the polymerization product to form a precipitate. For example, in some embodiments, removal of the salt (an)(cat) (for example, NaCl) is achieved by adding the polymerization reaction product to a solvent, such as methanol, to obtain a precipitate, and then filtering, cleaning and drying the precipitate. Before this removal process (i.e., before addition of the polymerization product to the solvent (e.g., methanol) to form the precipitate), the reaction mixture includes a solids content of about 1 to about 20 parts by weight, for example, about 1 to about 5 parts by weight, based on 100 parts by weight of the reaction mixture. Additionally, in the removal process, the amount of solvent (e.g., methanol) may be about 300 to about 30,000 parts by weight, for example about 500 to about 20,000 parts by weight, based on 100 parts by weight of the reaction mixture.

In some embodiments of the present invention, the precipitate is filtered, cleaned, and dried. In some embodiments of the present invention, the solvent addition and subsequent processes are repeated as necessary, optionally up to 2 times.

An example process for removing the salt (an)(cat) (for example, NaCl) using a solvent is as follows: a reaction product obtained from the polymerization is added to a solvent (such as methanol) to obtain a precipitate, and the precipitate is filtered, cleaned, and dried.

In some embodiments of the present invention, the polymerization is carried out using conventional polymerization methods, such as radical polymerization, anionic polymerization, cationic polymerization, or condensation polymerization.

If a non-ionic third repeating unit is present, it is included in the polymerization process.

In some embodiments of the present invention, the starting materials are mixed in a molar ratio that yields values for x, y, z and m as discussed above. For example, the molar ratios of the starting material are within the values discussed above with respect to x, y, z and m.

The polymer may be used as a binder of a lithium secondary battery. When the polymer is used as a binder of a secondary battery, the internal resistance of the battery may be decreased, and thus the lithium secondary battery may have an increased capacity retention ratio.

As a binder of a lithium secondary battery, the polymer may be used alone, or it may be used together with an additional binder to improve elasticity, the dispersibility of the active material, and the binding force of the active material to the current collector.

Nonlimiting examples of the additional binder include sodium-carboxymethylcellulose (Na-CMC), alginic acid derivative, chitosan derivatives, polyvinyl alcohol (PVA), polyacrylic acid (PAA), polysodiumacrylate (Na-PAA), polyvinylpyrrolidone (PVP), polyacrylamide (PAAm), aqueous dispersions of vinylidenefluoride/hexafluoropropylene copolymers (P(VDF-HFP)), aqueous dispersions of polyvinylidenefluoride (PVDF), polyacrylonitrile (PAN), aqueous dispersions of styrene-butadiene rubber (SBR), aqueous dispersions of butadiene rubber (BR), modified products thereof (for example, a polymer formed by substituting one of the forgoing materials with fluoride, a polymer formed by substituting the back bone of one of the forgoing materials with a sulfonic group (—SO2-), or a random copolymer, block copolymer, or alternating copolymer of one of these materials with other polymers. The additional binder is not limited to these materials and may be any one of various materials conventionally used in the art as a binder.

According to embodiments of the present invention, when the polymer is used as a first binder and is mixed with a second binder, the amount of the first binder may be about 20 to about 100 parts by weight based on 100 parts by weight of the total weight of the first binder and the second binder.

When the polymer is used as a binder, the polymer may be in a powder state. Alternatively, the polymer may be in a binder composition obtained by dissolving or dispersing the polymer in a solvent. The amount of the polymer may be between 0.2 and 100 weight %, for example 0.2 to 25 weight %, or 1 to 20 weight %, based on the total weight of the electrode binder composition. The electrode binder composition may contain a solvent, for example water. In some exemplary embodiments, the binder composition may be a 1 to 20 wt % aqueous solution of the polymer prepared by dissolving the polymer in water and a further solvent.

In embodiments of the present invention, the binder composition may further include an additive to improve additional characteristics. For example, the additive may be a dispersant, a thickener, a conductive agent, or a filler. In preparing the binder composition, the additive may be included by being mixed with the binder composition for forming the electrode. Alternatively, the additive may be prepared separately and used independently. The choice of additive may be dependent upon the active material and the binder, and in some cases, the additive may not be used at all.

The amount of the additive may vary according to the active material, binder, and the composition of the additive. For example, the amount of the additive may be about 0.1 to about 10 wt % based on the weight of the binder composition exclusive of the solvent.

A dispersant may be used as the additive, and the dispersant may be selected from substances that improve the dispersibility of the electrode active material (e.g., the positive active material of the negative active material) and conductive agent in the slurry. The dispersant may be a cationic dispersant, an anionic dispersant, or a non-ionic dispersant, and may be selected from hydrocarbons having lipophilic parts with 5 to 20 carbon atoms, acryl oligomers, ethylene oxide oligomers, propylene oxide oligomers, ethylene oxide oligomers, propylene oxide oligomers, and urethane oligomers.

A thickener may be used as the additive, and may be added to the slurry when the viscosity of the binder composition is low, in which case, the thickener can make coating the slurry on the current collector easier. The thickener may include at least one of carboxymethyl cellulose, carboxyethyl cellulose, ethyl cellulose, hydroxy methyl cellulose, hydroxy ethyl cellulose, hydroxy propyl cellulose, or polyvinylalcohol.

A conductive agent may be used as the additive, and is a component for improving the conduction path of the electrode. The conductive agent may be used to provide conductivity to the electrode. The conductive agent may be any electron conducting material so long as it does not cause a chemical change in the formed battery. Nonlimiting examples of the conductive agent include natural graphite, artificial graphite, carbon nanofibers, carbon black, acetylene black, ketjen black, and metal powders of copper, nickel, aluminum, or silver.

A filler may be used as the additive, and is an auxiliary component that enhances the strength of the binder to suppress expansion of the electrode. The filler may include at least one selected from fibrous materials, such as glass fibers, carbon fibers, or metal fibers.

As mentioned above, in embodiments of the present invention, water may be used as the solvent in the binder composition. However, according to other embodiments, the solvent may be at least one selected from N,N-dimethylformamide, N,N-dimethylacetamide, methylethylketone, cyclohexanone, ethyl acetate, butyl acetate, cellosolve acetate, propylene glycol monomethyl ether acetate, methylcellosolve, butylcellosolve, methylcarbitol, butylcarbitol, propylene glycol monomethyl ether, diethyleneglycol dimethyl ether, toluene, or xylene.

The amount of the solvent is not particularly limited as long as the prepared composition has a sufficient viscosity.

The binder composition is prepared by combining the components described above. Then, the binder composition is mixed with an electrode active material to prepare an active material layer composition.

When the electrode active material is a negative active material, the negative active material may have a volumetric expansion of 150 to 200%.

The negative active material may be selected from Si, $SiO_x$ (where $0<x<2$, for example $0.5<x<1.5$), Sn, $SnO_2$, silicon-containing metal alloys, and mixtures thereof. As a metal for forming a silicon-containing metal alloy, at least one of Al, Sn, Ag, Fe, Bi, Mg, Zn, in, Ge, Pb, or Ti may be used.

The negative active material may include a metal or metalloid capable of alloying with lithium, an alloy thereof, or an oxide thereof. Nonlimiting examples of the metal or metalloid capable of alloying with lithium include Si, Sn, Al, Ge, Pb, Bi, Sb, alloys of Si and Y (where Y is an alkali metal, an alkaline earth metal, a Group 13 element, a Group 14 element, a transition metal, a rare-earth element, or a combination thereof, but Y is not Si), and alloys of Sn and Y (where Y is an alkali metal, an alkaline earth metal, a Group 13 element, a Group 14 element, a transition metal, a rare-earth element, or a combination thereof, but Y is not Sn). For example, the element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof. Nonlimiting examples of an oxide of metal or metalloid capable of alloying with lithium include lithium titanium oxides, vanadium oxides, lithium vanadium oxides, $SnO_2$, and $SiO_x$ (where $0<x<2$).

For example, the negative active material may include at least one element selected from Group 13 elements, Group 14 elements, and Group 15 elements.

For example, the negative active material may include at least one of Si, Ge, or Sn.

The negative active material may be a mixture or composite of graphite and at least one selected from silicon, silicon oxide, and silicon-containing metal alloys.

For example, the negative active material may have a particular particle shape or a nano-sized structure. For example, the negative active material may have a shape such as a nanoparticle, a nanowire, a nanorod, a nanotube, or a nanobelt.

An example of a method of manufacturing a negative electrode will now be described. For example, a negative active material composition including a negative active material, a conducting agent and a binder may be molded into a certain shape. Alternatively, the negative active material composition may be coated on a current collect, such as copper foil.

In some embodiments, for example, a negative active material composition is prepared by mixing a negative active material, a conductive agent, a binder, and a solvent. The negative active material composition may be directly coated on a metal current collector to complete the manufacture of a negative electrode. Alternatively, the negative active material composition may be cast on a separate support to form a film, and the film may then be separated from the support and laminated on a metal current collector, thereby completing the manufacture of the negative electrode. However, manufacture of the negative electrode is not limited to these processes, and the negative electrode may also be formed using other methods.

The binder may be present in the negative active material composition in an amount of about 1 to about 10 parts by weight based on 100 parts by weight of the total weight of the negative active material composition. For example, the negative active material may be present in the negative active material composition in an amount of about 1 to about 3 parts by weight based on 100 parts by weight of the total weight of the negative active material composition.

Coating of the negative active material composition on the current collector may be performed by any suitable means, for example, screen printing, spray coating, coating using a doctor blade, Gravure coating, dip coating, silk screening, painting, or coating using a slot die. The coating method may be appropriately selected according to the desired viscosity of the negative active material composition.

The current collector may have a thickness of about 3 to about 20 μm.

The negative active material composition is coated on the current collector and/or substrate, and then heat treated at a temperature of about 80 to about 120° C. and dried to remove the solvent. The result is then roll-pressed and dried, thereby completing the manufacture of the negative electrode.

During the heat treatment, water (as the solvent) is removed from the electrode. Accordingly, when drying is performed at the temperature described above, bubble formation on the surface of the electrode may be suppressed, and the resulting electrode may have a homogeneous surface. The drying may be performed in an air atmosphere.

Following the heat treatment described above, a second heat treatment may be performed under vacuum conditions. The second heat treatment may be performed at a temperature of about 100 to about 200° C. and a vacuum degree of $1\times10^{-4}$ to $1\times10^{-6}$ torr.

The negative active material composition may additionally include (in addition to the negative active material) other carbonaceous negative active materials. For example, the carbonaceous negative active material may be crystalline carbon, amorphous carbon, or a mixture thereof. The crystalline carbon may be natural or artificial graphite that is tabular, flake, spherical, or fibrous in shape. The amorphous carbon may be soft carbon (e.g., cold calcined carbon) or hard carbon, meso-phase pitch carbide, calcined cork, graphene, carbon black, fullerene soot, carbon nanotubes, or carbon fibers. However, the crystalline carbon and the amorphous carbon are not limited to the above, and may be any one of various materials conventionally used in the art.

Nonlimiting examples of the conductive agent include carbonaceous materials, such as acetylene black, ketjen black, natural graphite, artificial graphite, carbon black, and carbon fibers; metal powders and metal fibers of copper, nickel, aluminum, or silver; and conductive materials, such as polyphenylene derivatives. However, the conductive agent is not limited thereto, and may be any one of various materials conventionally used as conductive agents in the art.

The negative electrode may additionally include a second binder in addition to the binders described above. Nonlimiting examples of the second binder include sodium-carboxymethylcellulose (Na-CMC), alginic acid derivatives, chitosan derivatives, polyvinyl alcohol (PVA), polyacrylic acid (PAA), polysodiumacrylate (Na-PAA), polyvinylpyrrolidone (PVP), polyacrylamide (PAAm), aqueous dispersions of vinylidenefluoride/hexafluoropropylene copolymer (P(VDF-HFP)), aqueous dispersions of polyvinylidenefluoride (PVDF), polyacrylonitrile (PAN), aqueous dispersions of styrene-butadiene rubber (SBR), aqueous dispersions of butadiene rubber (BR), modified products thereof (for example, a polymer formed by substituting one of the forgoing materials with fluoride, a polymer formed by substituting the back bone of one of the forgoing materials with a sulfonic group (—SO$_2$—), or a random copolymer, a block copolymer, or an alternating copolymer of one of these materials with other polymers). The second binder is not limited to the above and may be any one of various materials conventionally used as a binder in the art.

The current collector is not particularly limited and may be any material so long as it is conductive and does not cause a chemical change in the secondary battery. Nonlimiting examples of a material for forming the current collector include copper, stainless steel, aluminum, nickel, titanium, calcined carbon, and copper or stainless steel that is surface treated with carbon, nickel, titanium, silver, or an aluminum-cadmium alloy.

In addition, a fine uneven structure may be formed on the current collector to increase the binding force of the collector to the electrode active material. The current collector may have any of various shapes, such as a film, sheet, foil, net, porous, foam, or non-woven shape.

In the positive electrode, a compound (e.g., a lithiated intercalation compound) capable of reversibly intercalating and deintercalating lithium may be used as the positive active material. For example, the positive active material may include at least one selected from lithium cobalt oxides represented by LiCoO$_2$; lithium nickel oxides represented by LiNiO$_2$; lithium manganese oxides represented by Li1+xMn$_2$-xO$_4$ (where x is 0 to 0.33), LiMnO$_3$, LiMn$_2$O$_3$, or LiMnO$_2$; lithium copper oxides represented by Li$_2$CuO$_2$; lithium iron oxides represented by LiFe$_3$O$_4$; lithium vanadium oxides represented by LiV$_3$O$_8$; copper vanadium oxides represented by Cu$_2$V$_2$O$_7$; vanadium oxides represented by V$_2$O$_5$; lithium nickel composite oxides represented by LiNi$_{1-x}$M$_x$O$_2$ (where M is Co, Mn, Al, Cu, Fe, Mg, B, or Ga, and x=0.01 to 0.3); lithium manganese composite oxides represented by LiMn$_2$-xM$_x$O$_2$ (where M is Co, Ni, Fe, Cr, Zn, or Ta, and x is 0.01 to 0.1), or Li$_2$Mn$_3$MO$_8$ (where M is Fe, a Co, Ni, Cu, or Zn); lithium manganese oxides formed by substituting some of the Li with an alkaline earth metal ion represented by LiMn$_2$O$_4$; disulfide compounds; and iron molybdenum oxides represented by Fe$_2$(MoO$_4$)$_3$.

The positive active material may be, for example, a mixture of lithium cobalt oxide and lithium nickel cobalt manganese oxide.

In the positive electrode, the binder may be a binder according to an embodiment of the present invention may be used, or may be any one of various materials that enable binding of the positive active material particles to each other and that enable binding of the positive active material to the current collector. For example, the positive electrode binder may include at least one selected from polyvinylalcohol, carboxymethylcellulose, hydroxypropylcellulose, diacetylcellulose, polyvinylchloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, and nylon.

The positive active material may be at least one material selected from lithium cobalt oxides, lithium nickel cobalt manganese oxides, lithium nickel cobalt aluminum oxides, lithium iron phosphate oxides, and lithium manganese oxides. However, the positive active material is not limited thereto. For example, any one of various materials conventionally used as positive active materials may be used.

For example, the positive active material may be a compound represented by one of the following formulae:

$Li_aA_{1-b}B_bD_2$ (0.90≤a≤1.8, and 0≤b≤0.5);
$Li_aE_{1-b}B_bO_{2-c}D_c$ (0.90≤a≤1.8, 0≤b≤0.5, and 0≤c≤0.05);
$LiE_{2-b}B_bO_{4-c}D_c$ (0≤b≤0.5, and 0≤c≤0.05);
$Li_aNi_{1-b-c}Co_bB_cD_\alpha$ (0.90≤a≤1.8, 0≤b≤0.5, 0≤c≤0.05, and 0<α≤2);
$Li_aNi_{1-b-c}Co_bB_cO_{2-\alpha}F_\alpha$ (0.90≤a≤1.8, 0≤b≤0.5, 0≤c≤0.05, and 0<α<2);
$Li_aNi_{1-b-c}Co_bB_cO_{2-\alpha}F_2$ (0.90≤a≤1.8, 0≤b≤0.5, 0≤c≤0.05, and 0<α<2);
$Li_aNi_{1-b-c}Mn_bB_cD_\alpha$ (0.90≤a≤1.8, 0≤b≤0.5, 0≤c≤0.05, and 0<α≤2);
$Li_aNi_{1-b-c}Mn_bB_cO_{2-\alpha}F_\alpha$ (0.90≤a≤1.8, 0≤b≤0.5, 0≤c≤0.05, and 0<α<2);
$Li_aNi_{1-b-c}Mn_bB_cO_{2-\alpha}F_2$ (0.90≤a≤1.8, 0≤b≤0.5, 0≤c≤0.05, and 0<α<2);
$Li_aNi_bE_cG_dO_2$ (0.90≤a≤1.8, 0≤b≤0.9, 0≤c≤0.5, and 0.001≤d≤0.1);
$Li_aNi_bCo_cMn_dGeO_2$ (0.90≤a≤1.8, 0≤b≤0.9, 0≤c≤0.5, 0≤d≤0.5, 0.001≤e≤0.1);
$Li_aNiG_bO_2$ (0.90≤a≤1.8, and 0.001≤b≤0.1);
$Li_aCoG_bO_2$ (0.90≤a≤1.8, and 0.001≤b≤0.1);
$Li_aMnG_bO_2$ (0.90≤a≤1.8, and 0.001≤b≤0.1);
$Li_aMn_2G_bO_4$ (0.90≤a≤1.8, and 0.001≤b≤0.1);
$QO_2$;
$QS_2$;
$LiQS_2$; $V_2O_5$;
$LiV_2O_5$;
$LiIO_2$;
$LiNiVO_4$;
$Li_{(3-f)}J_2(PO_4)_3$ (0≤f≤2);
$Li_{(3-f)}Fe_2(PO_4)_3$ (0≤f≤2); and
$LiFePO_4$.

In the formulae above, A may be Ni, Co, Mn, or a combination thereof; B may be Al, Ni, Co, Mn, Cr, Fe, Mg, Sr, V, a rare-earth element, or a combination thereof; D may be O, F, S, P, or a combination thereof; E may be Co, Mn, or a combination thereof; F may be F, S, P, or a combination thereof; G may be Al, Cr, Mn, Fe, Mg, La, Ce, Sr, V, or a combination thereof; Q may be Ti, Mo, Mn, or a combination thereof; I may be Cr, V, Fe, Sc, Y, or a combination thereof; and J may be V, Cr, Mn, Co, Ni, Cu, or a combination thereof.

These compounds may have a coating layer on their surfaces, or may be mixed with a compound having a coating layer. The coating layer may include an oxide of a coating element, a hydroxide of a coating element, an oxyhydroxide of a coating element, an oxycarbonate of a coating element, or a hydroxycarbonate of a coating element. The compounds that form the coating layer may be amorphous or crystalline. The coating element included in the coating layer may be Mg, Al, Co, K, Na, Ca, Si, Ti, V, Sn, Ge, Ga, B, As, Zr, or a mixture thereof. The coating layer may be formed using any one of various coating methods compatible with the desired compounds and elements so long as the coating method does not adversely affect the properties of the positive active material. For example, spray coating, immersion, or the like may be used. These coating methods are known to those of ordinary skill in the art and are therefore not described in detail herein.

Nonlimiting examples of the positive active material include LiNiO$_2$, LiCoO$_2$, LiMn$_x$O$_{2x}$ (where x=1 or 2), LiNi$_{1-x}$Mn$_x$O$_2$ (where 0<x<1), LiNi$_{1-x-y}$Co$_x$Mn$_y$O$_2$ (where 0≤x≤0.5, 0≤y≤0.5), LiFeO$_2$, V$_2$O$_5$, TiS, and MoS.

A positive active material composition may include a conductive agent, a binder, and a solvent, which may be the same as those used in the negative active material composition.

A method of manufacturing a positive electrode including the positive active material may be the same as the method for manufacturing the negative electrode, except that the positive active material is used instead of the negative active material.

The amounts of the positive active material, the conductive agent, and the solvent may be the same as the amounts used in a conventional lithium secondary battery. Also, depending on the desired use and structure of the lithium secondary battery, one or both of the conductive agent and the solvent may be omitted. In addition, in the method for manufacturing the positive electrode, a dispersant, a thickener, or a filler may also be used.

According to other embodiments of the present invention, a secondary battery includes the above described electrodes. In particular, the secondary battery includes the negative electrode, the positive electrode, a separator, and a lithium salt-containing non-aqueous electrolyte.

The separator is between the positive electrode and the negative electrode, and may be an insulating thin film having high ion permeability and mechanical strength.

The separator may have a pore size of about 0.01 to about 10 µm, and a thickness of about 5 to about 20 µm. The separator may be formed of, for example, chemical-resistant and hydrophobic olefin-based polymers, such as polypropylene; glass fibers; or a sheet or non-woven fabric formed of polyethylene. When a solid electrolyte, such as a polymer, is used as the electrolyte, the solid electrolyte may also act as the separator.

Nonlimiting examples of an olefin-based polymer for use as the separator include polyethylene, polypropylene, polyvinylidene fluoride, and multi layers of two or more of these. For example, the separator may be a mixed multilayer, such as a polyethylene/polypropylene two-layer separator, a polyethylene/polypropylene/polyethylene three-layer separator, or a polypropylene/polyethylene/polypropylene three-layer separator.

The lithium salt-containing non-aqueous electrolyte may include a non-aqueous electrolyte and a lithium salt. The non-aqueous electrolyte may be a non-aqueous electrolytic solution, an organic solid electrolyte, or an inorganic solid electrolyte.

A nonlimiting example of the non-aqueous electrolytic solution is an aprotic solvent. Nonlimiting examples of the aprotic solvent include N-methyl-2-pyrrolidone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethyl formamide, acetonitrile, nitromethane, methyl formate, methyl acetate, triester phosphate, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, and fluoroethylene carbonate (FEC).

Nonlimiting examples of the organic solid electrolyte include polyethylene derivatives, polyethylene oxide derivatives, polypropylene oxide derivatives, phosphate ester polymers, poly agitation lysine, polyester sulfide, polyvinyl alcohol, polyvinylidene fluoride, and polymers containing dissociable ionic groups.

Nonlimiting examples of the inorganic solid electrolyte include nitrates, halides, and sulfates of Li, such as $Li_3N$, LiI, $Li_5NI_2$, $Li_3N$—LiI—LiOH, $Li_2SiS_3$, $Li_4SiO_4$, $Li_4SiO_4$—LiO—LiOH, or $Li_3PO_4$—$Li_2S$—$SiS_2$.

The lithium salt includes a material that easily dissolves in the non-aqueous electrolyte. Nonlimiting examples of the lithium salt include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic lithium carbonates, and lithium tetrakis(phenyl)borate. In addition, to improve the charging and discharging characteristics and fire retardancy of the lithium battery, the non-aqueous electrolyte may further include pyridine, triethylphosphite, triethanolamine, cyclic ether, ethylene diamine, n-glyme, hexa triamide phosphate, a nitrobenzene derivative, sulfur, a quinine imine dye, a N-substituted oxazolidinone, a N,N-substituted imidazolidine, an ethylene glycol dialkyl ether, an ammonium salt, pyrrole, 2-methoxy ethanol, or trichloride aluminum. According to another embodiment, a halogen-containing solvent, such as tetrachloride carbon or trifluoride ethylene, may be further included to provide incombustibility. According to another embodiment, carbon dioxide gas may be further included to improve high-temperature preservation characteristics.

Referring to FIG. 1, a lithium secondary battery 1 includes a positive electrode 3, a negative electrode 2, and a separator 4. The positive electrode 3, the negative electrode 2, and the separator 4 may be wound or folded and placed in a battery case 5. Subsequently, an organic electrolytic solution is injected into the battery case 5, and the battery case 5 is sealed with a cap assembly 6, thereby completing the manufacture of the lithium secondary battery 1. The battery case may be cylindrical, rectangular, thin film-shaped, or the like. For example, the lithium secondary battery may be a thin film-shaped battery. For example, the lithium secondary battery may be a lithium ion battery.

The lithium secondary battery may have a charging voltage of 4.3 V or greater.

The separator may be positioned between the positive electrode and the negative electrode to form a battery assembly. A plurality of battery assemblies may be stacked in a bi-cell structure and then impregnated with an organic electrolytic solution. The obtained result is housed in a pouch and sealed, thereby completing the manufacture of a lithium ion polymer battery.

Also, a plurality of the battery assemblies may be stacked to form a battery pack, and the battery pack may be used in various devices that require high capacity and high power output. For example, the battery assemblies may be used in a notebook computer, a smartphone, an electric vehicle, or the like.

In particular, due to its good high-rate characteristics and lifespan characteristics, the lithium secondary battery may be suitable for use in an electric vehicle (EV), for example, a hybrid car, such as a plug-in hybrid electric vehicle (PHEV).

Substituents in the formulae above may be defined as follows.

As used herein, alkyl refers to a fully saturated branched or unbranched (or straight chain or linear) hydrocarbon moiety. Nonlimiting examples of the alkyl group include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, and n-heptyl.

As used herein, substituted alkyl refers to the substitution of at least one hydrogen atom of the alkyl group with a halogen atom, a C1-C30 alkyl substituted with a halogen atom (for example, $CCF_3$, $CHCF_2$, $CH_2F$ and $CCl_3$), a C1-C30 alkoxy, a C2-C30 alkoxyalkyl, a hydroxy group, a nitro group, a cyano group, an amino group, an amidino group, a hydrazine, a hydrazone, a carboxyl group or a salt thereof, a sulfonyl group, a sulfamoyl group, a sulfonic acid group or a salt thereof, a phosphoric acid group or a salt thereof, a C1-C30 alkyl, a C2-C30 alkenyl, a C2-C30 alkynyl, a C1-C30 heteroalkyl, a C6-C30 aryl, a C7-C30 arylalkyl, a C6-C30 heteroaryl, a C7-C30 heteroarylalkyl, a C6-C30 heteroaryloxy, a C6-C30 heteroaryloxyalkyl, or a C6-C30 heteroarylalkyloxy.

As used herein, halogen atom refers to fluoride, bromide, chloride, or iodide.

As used herein, C1-C30 alkyl group substituted with a halogen atom refers to a C1-C30 alkyl group that is substituted with one or more halogen atoms. Nonlimiting examples of a C1-C30 alkyl group that is substituted with one or more halogen atoms include monohaloalkyls, dihaloalkyls, and polyhaloalkyls including perhaloalkyls.

The monohaloalkyl has one iodo, bromo, chloro or fluoro within the alkyl group, the dihaloalky has two iodo, bromo, chloro or fluoro within the alkyl group, and the polyhaloalkyl group has two or more iodo, bromo, chloro or fluoro within the alkyl group. The two or more halo atoms in the dihaloalkyl and polyhaloalkyl may be the same or different from each other.

As used herein, alkoxy refers to a substituent represented by alkyl-O—, where the alkyl is as defined above. Nonlimiting examples of the alkoxy include methoxy, ethoxy, propoxy, 2-propoxy, butoxy, tert-butoxy, pentoxy, hexyloxy, cyclopropyloxy, cyclohexyloxy, and the like. As used herein, substituted alkoxy refers to the substitution of at least one hydrogen atom of the alkoxy group with the substituents described above in connection with the alkyl group.

As used herein, aryl refers to an aromatic hydrocarbon group having one or more rings. A single aryl group may be used or a combination of aryl groups may be used. Aryl also refers to a group in which an aromatic ring is fused to one or more cycloalkyl rings. Nonlimiting examples of the aryl group include phenyl, naphthyl, and tetrahydronaphthyl. As used herein, substituted aryl refers to the substitution of at least one hydrogen atom of the aryl group with the substituents described above in connection with the alkyl group.

As used herein, arylalkyl refers to an alkyl substituted with an aryl. Nonlimiting examples of the arylalkyl include benzyl or phenyl-$CH_2CH_2$—.

As used herein, aryloxy refers to a substituent represented by —O-aryl, where aryl is as defined above. Nonlimiting examples of the aryloxy include phenoxy and the like. As used herein, substituted aryloxy refers to the substitution of at least one hydrogen atom of the aryloxy with the substituents described above in connection with the alkyl group.

As used herein, heteroaryl refers to a monocyclic or bicyclic organic compound that contains one or more hetero atoms in the ring and in which the remaining ring atoms are carbon atoms. The hetero atom may be selected from N, O, P, and S. The heteroaryl may include, for example, 1 to 5 hetero atoms, and 5 to 10 ring members. S or N may be oxidized to have various oxidation states. Heteroaryl also refers to a group in which a heteroaromatic ring is fused to one or more aryl, cycloaliphatic, or heterocyclic rings.

Nonlimiting examples of monocyclic heteroaryl groups including thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiazolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl, oxazol-5-yl, isooxazol-3-yl, isooxazol-4-yl, isooxazol-5-yl, 1,2,4-triazol-3-yl, 1,2,4-triazol-5-yl, 1,2,3-triazol-4-yl, 1,2,3-triazol-5-yl, tetrazolyl, pyrid-2-yl, pyrid-3-yl, 2-pyrazin-2yl, pyrazin-4-yl, pyrazin-5-yl, 2-pyrimidin-2-yl, 4-pyrimidin-2-yl, and 5-pyrimidin-2-yl.

Nonlimiting examples of bicyclic heteroaryls include indolyl, isoindolyl, indazolyl, indolizinyl, purinyl, quinolizinyl, quinolinyl, isoquinolinyl, cinnolinyl, phthalazinyl, naphthyridinyl, quinazolinyl, quinaxalinyl, phenanthridinyl, phenathrolinyl, phenazinyl, phenothiazinyl, phenoxazinyl, benzisoquinolinyl, thieno[2,3-b]furanyl, furo[3,2-b]-pyranyl, 5H-pyrido[2,3-d]-o-oxazinyl, 1H-pyrazolo[4,3-d]-oxazolyl, 4H-imidazo[4,5-d]thiazolyl, pyrazino[2,3-d]pyridazinyl, imidazo[2,1-b]thiazolyl, imidazo[1,2-b][1,2,4]triazinyl, 7-benzo[b]thienyl, benzoxazolyl, benzimidazolyl, benzothiazolyl, benzoxazinyl, benzofuryl, benzothiophenyl, benzotriazolyl, pyrrolo[2,3-b]pyridinyl, pyrrolo[3,2-c]pyridinyl, pyrrolo[3,2-b]pyridinyl, imidazo[4,5-b]pyridinyl, imidazo[4,5-c]pyridinyl, pyrazolo[4,3-d]pyridinyl, pyrazolo[4,3-c]pyridinyl, pyrazolo[3,4-c]pyridinyl, pyrazolo[3,4-d]pyridinyl, pyrazolo[3,4-b]pyridinyl, imidazo[1,2-a]pyridinyl, pyrazolo[1,5-a]pyridinyl, pyrrolo[1,2-b]pyridazinyl, imidazo[1,2-c]pyrimidinyl, pyrido[3,2-d]pyrimidinyl, pyrido[4,3-d]pyrimidinyl, pyrido[3,4-d]pyrimidinyl, pyrido[2,3-d]pyrimidinyl, pyrido[2,3-b]pyrazinyl, pyrido[3,4-b]pyrazinyl, pyrimido[5,4-d]pyrimidinyl, pyrazino[2,3-b]pyrazinyl, and pyrimido[4,5-d]pyrimidinyl.

As used herein, substituted heteroaryl refers to the substitution of at least one hydrogen atom in the heteroaryl group with the substituents described above in connection with the alkyl group.

As used herein, heteroarylalkyl refers to an alkyl substituted with a heteroaryl group.

As used herein, heteroaryloxy refers to a substituent represented by —O-heteroaryl. As used herein, substituted heteroaryloxy refers to the substitution of at least one hydrogen atom of the heteroaryloxy with the substituents described above in connection with the alkyl group.

As used herein, cycloalkyl refers to non-aromatic, monocyclic, bicyclic or tricyclic saturated or partially unsaturated hydrocarbon groups.

Nonlimiting examples of monocyclic hydrocarbon groups include cyclopentyl, cyclopentenyl, cyclohexyl and cyclohexenyl.

Nonlimiting examples of bicyclic hydrocarbon groups include bornyl, decahydronaphthyl, bicyclo[2.1.1]hexyl, bicyclo[2.2.1]heptyl, bicyclo[2.2.1]heptenyl, and bicyclo[2.2.2]octyl.

A nonlimiting example of a tricyclic hydrocarbon group is adamantyl.

As used herein, substituted cycloalkyl refers to the substitution of at least one hydrogen atom in the cycloalkyl group with the substituents described above in connection with the alkyl group.

As used herein, heterocycloalkyl refers to a ring containing 5-10 ring atoms including at least one hetero atom, such as N, S, P, or O. A nonlimiting example of a heterocycloalkyl is pyridyl. As used herein, substituted cycloalkyl refers to the substitution of at least one hydrogen atom of the heterocycloalkyl group with the substituent described above in connection with the alkyl group.

As used herein, sulfonyl refers to a substituent represented by R"—$SO_2$—, where R" is hydrogen, alkyl, aryl, heteroaryl, aryl-alkyl, heteroaryl-alkyl, alkoxy, aryloxy, cycloalkyl, or heterocycloalkyl.

A used herein, sulfamoyl refers to a substituent represented by $H_2NS(O_2)$—, alkyl-$NHS(O_2)$—, $(alkyl)_2NS(O_2)$—, aryl-$NHS(O_2)$—, alkyl-(aryl)-$NS(O_2)$—, $(aryl)_2NS(O)_2$, heteroaryl-$NHS(O_2)$—, (aryl-alkyl)-$NHS(O_2)$—, or (heteroaryl-alkyl)-$NHS(O_2)$—.

As used herein, amino refers to a compound in which a nitrogen atom is covalently bonded to at least one carbon or heteroatom. Amino includes, for example, —NH$_2$ and substituted moieties.

Amino also includes alkylamino in which nitrogen binds to at least one additional alkyl group. Amino also includes arylamino and diarylamino in which the nitrogen is bound to at least one (arylamino) or two (diarylamino) independently selected aryl groups.

Hereinafter, embodiments of the present invention are described with reference to Examples. However, the Examples are presented for illustrative purposes only and do not limit the scope of the present invention.

Preparation Example 1

Polymer Represented by Formula 27(a)

50 mol % of acryloyloxy ethyl trimethylammonium chloride, 40 mol % of sodium acrylate, and 10 mol % of 2-hydroxyethyl acrylate were loaded into a reaction vessel equipped with an agitator and a condenser. A total weight of the monomers was 20 g.

0.023 g of 2,2'-azobis(2-methylpropionamidine) dihydrochloride (AMPAC) as a reaction initiator and 70 g of pure water were added into the vessel containing the monomers.

N$_2$ bubbling was performed for 30 minutes to remove dissolved oxygen in solution, and then, the temperature of the reaction vessel was increased to 60° C. to perform polymerization.

Following 30 minutes of polymerization, 30 g of deoxygenated water was added thereto, and the reaction was performed for 4 hours. Then, the temperature of the reaction vessel was lowered to room temperature to stop the polymerization reaction.

The reaction product in the reaction vessel in which the polymerization reaction was completed was slowly added to 10 L of MeOH to prepare a precipitate.

To prepare pure polymer, the precipitate was filtered, and then dissolved in water to prepare a 10 wt % solution thereof. Then, the result was precipitated in 10 L of MeOH, thereby preparing a polymer (poly(acryloyloxyethyl trimethylammonium chloride-co-acrylate-co-2-hydroxyethyl acrylate) (poly(AETAC-co-A-co-HEA)) represented by Formula 27(a).

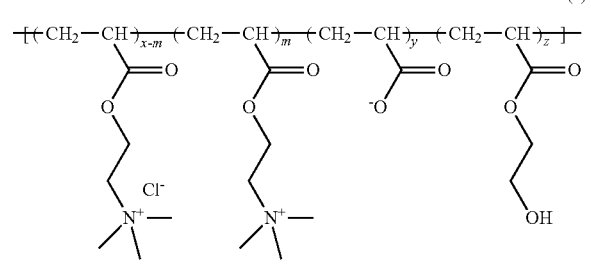

Formula 27(a)

In Formula 27(a), m is 0.4, x is 0.5, y is 0.4, and z is 0.1.

Preparation Example 2

Synthesis of Polymer Represented by Formula 26(c)

The polymerization reaction was performed in the same manner as in Preparation Example 1, except that 30 mol % of diallyldimethylammonium chloride, 60 mol % of acrylic acid, and 10 mol % of vinyl acetate were used as the monomers instead of 50 mol % of acryloyloxy ethyl trimethylammonium chloride, 40 mol % of sodium acrylate, and 10 mol % of 2-hydroxy ethyl acrylate.

NaOH was added to the reaction vessel in which the polymerization reaction was completed in an equivalent 1.1 times greater than the total equivalents of acrylic acid and vinyl acetate. Then, the temperature was increased to 90° C. and hydrolysis was performed for 2 hours.

Thereafter, the reaction product in the reaction vessel in which the polymerization reaction was completed was slowly added to 10 L of MeOH to prepare a precipitate.

To prepare pure polymer, the precipitate was filtered, and then dissolved in water to prepare a 10% solution thereof. Then, the result was precipitated in 10 L of MeOH, thereby preparing a polymer (poly(diallyldimethyl ammonium-co-sodium acrylate-co-vinyl alcohol)(poly(DADMA-co-SA-VA))) represented by Formula 26(c) below.

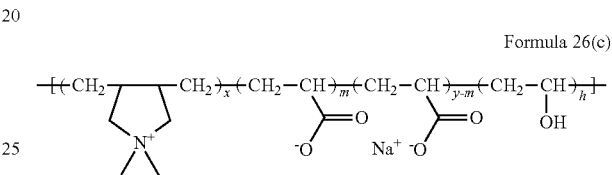

Formula 26(c)

In Formula 26(c), m is 0.3, x is 0.3, y is 0.6, and z is 0.1.

Preparation Example 3

Synthesis of Polymer Represented by Formula 29(a)

A polymer (poly(acryloyloxyethyl trimethylphosphonium-co-sodium acrylate-co-2-hydroxyethyl acrylate): poly(AETP-co-SA-co-HEA)) represented by Formula 29(a) was prepared in the same manner as in Preparation Example 1, except that 30 mol % of acryloyloxyethyl trimethylphosphonium chloride, 60 mol % of sodium acrylate, and 10 mol % of 2-hydroxy ethyl acrylate were used as the monomers instead of 50 mol % of acryloyloxy ethyl trimethylammonium chloride, 40 mol % of sodium acrylate, and 10 mol % of 2-hydroxy ethyl acrylate.

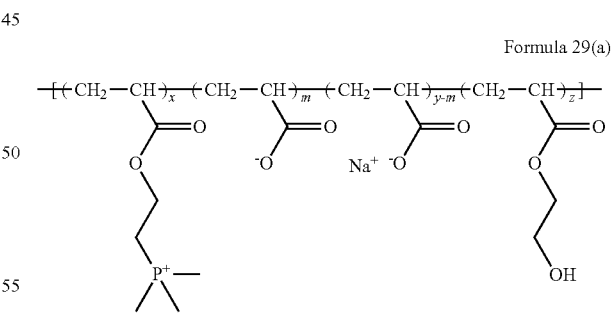

Formula 29(a)

In Formula 29a, m is 0.3, x is 0.3, y is 0.6, and z is 0.1.

Preparation Example 4

Synthesis of Polymer Represented by Formula 22(a)

Poly(acryloyloxyethyl trimethylammonium-co-sodium ethyleneglycol acrylate phosphate) (poly(AETA-co-SA-co-SEGAP)) represented by Formula 22(a) below was prepared in the same manner as Preparation Example 1, except that 70 mol % of acryloylethyl trimethylammonium chloride, 20 mol % of sodium acrylate, and 10 mol % of sodium ethyleneglycol acrylate phosphate were used as the monomers instead of 50 mol % of acryloyloxy ethyl trimethylammonium chloride, 40 mol % of sodium acrylate, and 10 mol % of 2-hydroxy ethyl acrylate.

Formula 22(a)

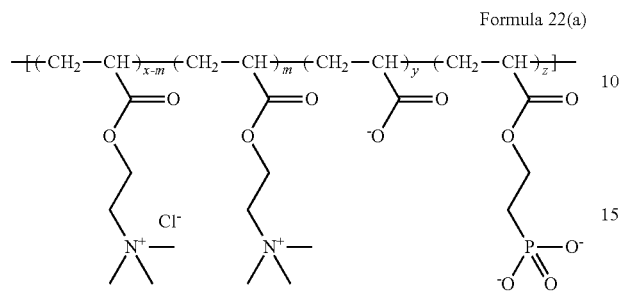

In Formula 22(a), m is 0.4, x is 0.7, y is 0.2, and z is 0.1.

Preparation Example 5

Synthesis of Polymer Represented by Formula 16(a)

The polymerization reaction was performed in the same manner as in Preparation Example 1, except that 30 mol % of diallyldimethylammonium chloride and 70 mol % of acrylamide were used as the monomers instead of 50 mol % of acryloyloxy ethyl trimethylammonium chloride, 40 mol % of sodium acrylate, and 10 mol % of 2-hydroxy ethyl acrylate.

NaOH was added to the reaction vessel in which the polymerization reaction was completed in an equivalent 1.1 times greater than the equivalents of acrylamide and vinyl acetate. Then, the temperature was increased to 90° C. and hydrolysis was performed for 2 hours.

Thereafter, the reaction product in the reaction vessel in which the polymerization reaction was completed was slowly added to 10 L of MeOH to prepare a precipitate.

To prepare pure polymer, the precipitate was filtered, and then dissolved in water to prepare a 10 wt % solution thereof. Then, the result was precipitated in 10 L of MeOH, thereby preparing a polymer {poly(diallyldimethyl ammonium-co-sodium acrylate)(poly(DADMA-co-SA))} represented by Formula 16(a) below.

The viscosity of a 5 wt % aqueous solution of the polymer was 20,000 cP.

Figure 2:
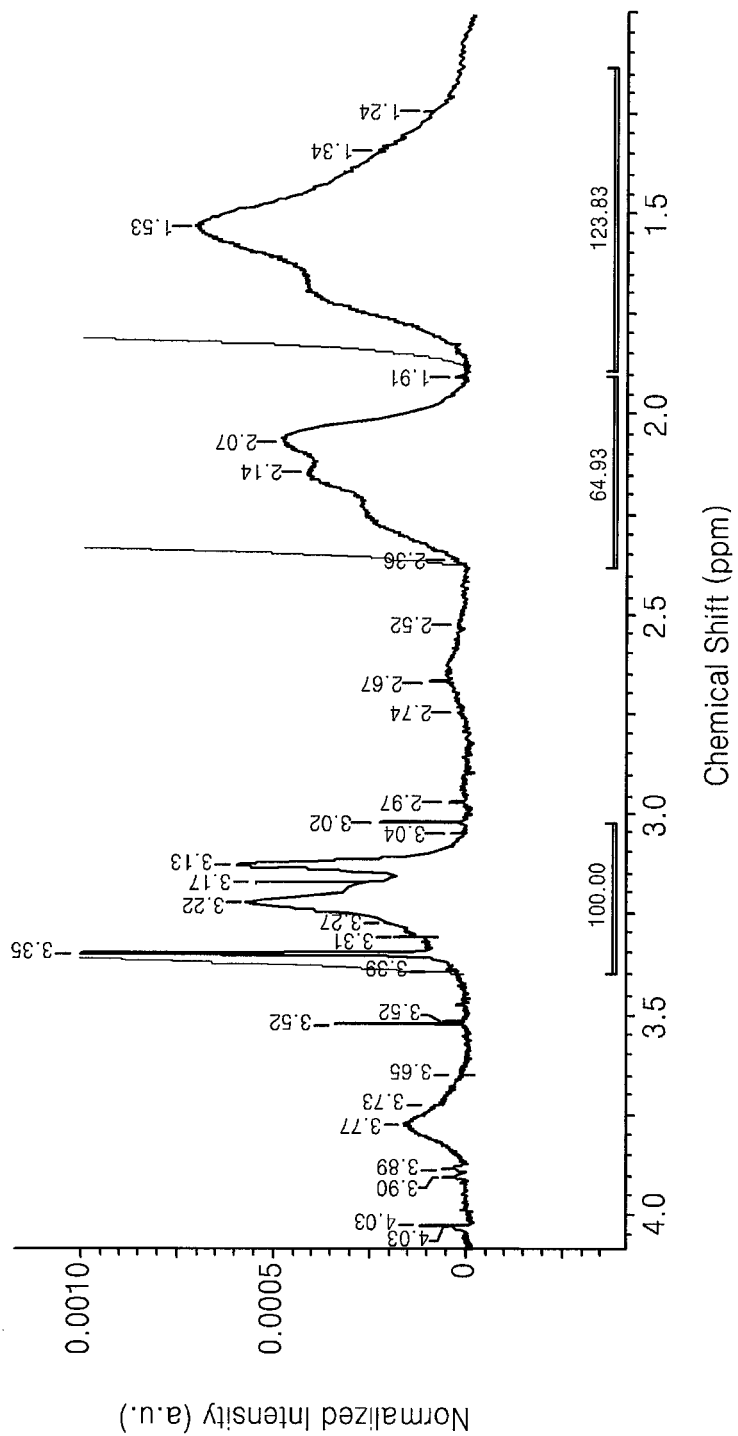
FIG. 2 is a nuclear magnetic resonance spectrum of the polymer prepared according to Preparation Example 5.

The polymer prepared according to Preparation Example 5 was subjected to nuclear magnetic resonance, and the obtained spectrum is shown in FIG. 2.

Referring to the nuclear magnetic resonance spectrum of FIG. 2, the proton peak of the cationic moiety (that is, $N^+(CH_2)_2$ and $N^+(CH_3)_2$) is in a range of 3 to 3.5 ppm, and the proton peak of the anionic moiety (that is, $(CH)COO^-$) is in a range of 2 to 2.5 ppm.

Formula 16(a)

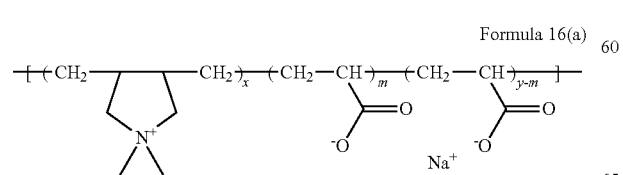

In Formula 16(a), x is 0.3, y is 0.7, and m is 0.3.

Comparative Preparation Example 1

Synthesis of poly(diallyldimethylammonium chloride-co-acrylamide)

The polymerization reaction was performed in the same manner as in Preparation Example 1, except that 30 mol % of diallyldimethylammonium chloride and 70 mol % of acrylamide were used as the monomers instead of 50 mol % of acryloyloxy ethyl trimethylammonium chloride, 40 mol % of sodium acrylate, and 10 mol % of 2-hydroxy ethyl acrylate. The resulting monomer was poly(diallyldimethyl ammonium chloride-co-acrylamide)(poly(DADMAC-co-AAmd)) having a repeating unit including a cation.

Example 1

Preparation of Binder Composition A and Negative Active Material Layer Composition 1

A binder composition having 2 w % solids content was obtained by dissolving the polymer of Preparation Example 1 in 98 g of water in a reaction vessel equipped with an agitator.

A negative active material layer composition 1 including 50 g of a 2 wt % solution of the binder composition, 3 g of SiOx (product of Shinetsu Company, and having a 10 um average particle diameter), and 46 g of graphite was prepared in a slurry preparation vessel. During preparation of the composition, a small amount of water was added to adjust the viscosity.

Examples 2-5

Preparation of Binder Compositions B-E and Negative Active Material Layer Compositions 2-5

Binder compositions B to E and negative active material layer compositions 2 to 5 were prepared in the same manner as in Example 1, except that the polymers prepared according to Preparation Examples 2-5, respectively, were used instead of the polymer prepared according to Preparation Example 1.

Comparative Example 1

Preparation of Negative Active Material Layer Composition

A negative active material layer composition was prepared in the same manner as in Example 1, except that sodium carboxymethylcellulose and styrene butyrene rubber (Na-CMC/SBR) were used at a weight ratio of 1:1 instead of the polymer prepared according to Preparation Example 1.

Comparative Example 2

Preparation of Negative Active Material Layer Composition

A negative active material layer composition was prepared in the same manner as in Example 1, except that sodium carboxymethylcellulose and styrene butyrene rubber (Na-CMC/SBR) were used at a weight ratio of 1:1 instead of the poly(diallyldimethylammonium chloride-co-acrylamide) prepared according to Comparative Preparation Example 1.

Comparative Example 3

Preparation of Negative Active Material Layer Composition

A negative active material layer composition was prepared in the same manner as in Example 1, except that poly(sodium acrylate) (average Mw=220,000 g/mol) was used instead of the polymer prepared according to Preparation Example 1.

Comparative Example 4

Preparation of Negative Active Material Layer Composition

A negative active material layer composition was prepared in the same manner as in Example 1, except that a mixture of poly(diallyldimethylammonium chloride-co-acrylamide) prepared according to Comparative Preparation Example 1 and poly(sodium acrylate) (average Mw=220,000 g/mol) in a 1:1 molar ratio was used instead of the polymer prepared according to Preparation Example 1.

Manufacturing Example 1

Manufacturing of Electrode and Battery

The negative active material layer composition prepared according to Example 1 was coated on a copper foil current collector having a thickness of 10 μm to form a coating layer having a thickness of 90 μm, and then dried at 110° C. for 30 minutes to manufacture a negative electrode plate. Subsequently, the negative electrode plate was punched, roll-pressed, and welded, and then dried in a vacuum oven at a temperature of 300° C. for 2 hours, thereby completing the manufacture of a negative electrode.

20 g of a mixed active material including $LiCoO_2$(LCO) and $LiNi_{1/3}Co_{1/3}Mn_{1/3}O_2$(NCM) at a mixed weight ratio of 1:1, and 1.1 g of a carbon conductive agent (Super-P; Timcal Ltd.) were homogeneously mixed. Then, a polyvinylidene fluoride (PVDF) binder solution was added thereto to prepare a positive active material slurry including the active material, the carbon conductive agent, and the binder at a weight ratio of 90:5:5. The positive active material slurry was coated on an aluminum foil current collector having a thickness of 15 μm and dried to complete the manufacture of a positive electrode plate. Subsequently, the positive electrode plate was punched, roll-pressed, and welded, and then dried in a vacuum oven at a temperature of 130° C. for 12 hours to manufacture a positive electrode.

A 2016R-type coin cell was manufactured using the negative electrode and the positive electrode.

The cell included a polypropylene separator and an electrolyte including 1.0M LiPF6 dissolved in a mixed solvent including ethylenecarbonate (EC) and diethylcarbonate (DEC) at a volumetric ratio of 1:1.

Manufacturing Example 2

Manufacturing of Electrode and Battery

A negative electrode, a positive electrode, and a lithium secondary battery were manufactured in the same manner as in Manufacturing Example 1, except that binder composition B and negative active material layer composition 2 prepared according to Example 2 were used.

Manufacturing Example 3

Manufacturing of Electrode and Battery

A negative electrode, a positive electrode, and a lithium secondary battery were manufactured in the same manner as in Manufacturing Example 1, except that binder composition C and negative active material layer composition 3 prepared according to Example 3 were used.

Manufacturing Example 4

Manufacturing of Electrode and Battery

A negative electrode, a positive electrode, and a lithium secondary battery were manufactured in the same manner as in Manufacturing Example 1, except that binder composition D and negative active material layer composition 4 prepared according to Example 4 were used.

Manufacturing Example 5

Manufacturing of Electrode and Battery

A negative electrode, a positive electrode, and a lithium secondary battery were manufactured in the same manner as in Manufacturing Example 1, except that binder composition E and negative active material layer composition 5 prepared according to Example 5 were used.

Comparative Manufacturing Example 1

Manufacturing of Electrode and Battery

A negative electrode, a positive electrode, and a lithium secondary battery were manufactured in the same manner as in Manufacturing Example 1, except that negative active material layer composition of Comparative Example 1 was used instead of the negative active material layer composition of Example 1.

Comparative Manufacturing Examples 2-4

Manufacturing of Electrodes and Batteries

The inventors of the present application tried to manufacture a negative electrode, a positive electrode, and a lithium secondary battery in the same manner as in Manufacturing Example 1, but using the negative active material layer compositions of Comparative Examples 2-4 instead of the negative active material layer composition of Example 1.

However, the negative active material layer compositions manufactured according to Comparative Examples 2-4 had poor storage stability. Thus, over time, the active materials sunk, or due to a decrease in dispersibility during manufacturing the negative active material layer composition, the active materials aggregated. Thus, the negative active material layer compositions could not be coated on the current collector. Accordingly, electrodes using the negative active material layer compositions of Comparative Examples 2-4 could not be manufactured.

Comparative Manufacturing Example 5

Manufacturing of Electrode and Battery

A negative electrode, a positive electrode, and a lithium secondary battery were manufactured in the same manner as in Manufacturing Example 1, except that the negative active material layer composition of Comparative Example 5 was used instead of the negative active material layer composition of Example 1.

Evaluation Example 1

Analysis of Viscosity of Polymer

The viscosities of the polymers prepared according to Preparation Examples 1-5 were measured, and the results are shown in Table 1 below.

TABLE 1

|  | Viscosity (cP) |
| --- | --- |
| Preparation Example 1: | 26,000 |
| Preparation Example 2: | 52,000 |
| Preparation Example 3: | 32,000 |
| Preparation Example 4: | 48,000 |
| Preparation Example 5: | 40,000 |

Evaluation Example 2

Charging and Discharging Evaluation

The coin cells manufactured according to Manufacturing Examples 1-5 and Comparative Manufacturing Example 1 were charged at a constant current of 0.05 C at a temperature of 25° C. until the voltage reached 4.35 V (vs. Li). Subsequently, discharging was performed at a constant current of 0.05 C until the voltage reached 2.75 V (vs. Li) (formation process).

After the formation process, the lithium secondary batteries were charged at a constant current of 0.5 C at a temperature of 25° C. until the voltage reached 4.35V (vs. Li). Subsequently, discharging was performed at a constant current of 1.0 C until the voltage reached 2.75V (vs. Li). This charging and discharging cycle was repeated 50 times.

The charging and discharging test results are partially shown in Table 2 below. Charging and discharging efficiency is represented by Equation 1, initial formation efficiency is represented by Equation 2, and the capacity retention ratio is represented by Equation 3.

Charging and discharging efficiency [%]=[discharge capacity/charging capacity]×100    Equation 1

Initial formation efficiency [%]=[%]=[discharging capacity in 1$^{st}$ cycle/charging capacity in 1$^{st}$ cycle]×100    Equation 2

Capacity retention ratio [%]=[%]=[discharging capacity in 50$^{th}$ cycle/charging capacity in 1$^{st}$ cycle]×100    Equation 3

TABLE 2

| Manufacturing Example 1: | Discharging capacity in 1$^{st}$ cycle (mAh/cc) | Initial formation efficiency (%) | Capacity retention ratio (%) @ 50 cycles |
| --- | --- | --- | --- |
| Manufacturing Example 1: | 1720 | 89 | 95 |
| Manufacturing Example 2: | 1722 | 88 | 96 |
| Manufacturing Example 3: | 1721 | 89 | 95 |

TABLE 2-continued

| Manufacturing Example 1: | Discharging capacity in 1$^{st}$ cycle (mAh/cc) | Initial formation efficiency (%) | Capacity retention ratio (%) @ 50 cycles |
| --- | --- | --- | --- |
| Manufacturing Example 4: | 1719 | 88 | 95 |
| Manufacturing Example 5: | 1723 | 90 | 94 |
| Comparative Manufacturing Example 1 | 1714 | 88 | 88 |

Referring to Table 2, the lithium secondary batteries of Manufacturing Examples 1-5 have initial discharging capacities and initial formation efficiencies similar to those of the lithium secondary battery of Comparative Manufacturing Example 1. However, the lithium secondary batteries of Manufacturing Examples 1-5 showed improved capacity retention ratios compared to the lithium secondary battery of Comparative Manufacturing Example 1.

While certain embodiments of the present invention have been illustrated and described, it is understood that various modifications and changes to the described embodiments can be made without departing from the spirit and scope of the present invention, as defined in the following claims.

What is claimed is:

1. An electrode binder composition for a rechargeable lithium battery comprising:
   an aqueous solvent; and
   a polymer composition comprising first and second polymer compounds, each of the first and second polymer compounds comprising a first repeating unit having a cationic group and a second repeating unit having an anionic group, wherein the cationic group of the first polymer compound forms an intermolecular ionic bond with the anionic group of the second polymer compound, and the anionic group of the first polymer compound forms an intermolecular ionic bond with the cationic group of the second polymer compound,
   wherein:
   (i) each of the first repeating unit of the first polymer compound and the first repeating unit of the second polymer compound is represented by one of Formula 1(a), 1(b) or 3:

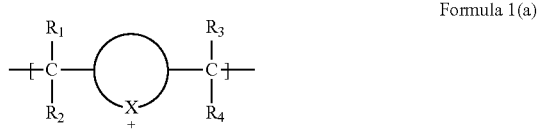

Formula 1(a)

Formula 1(b)

wherein in Formulae 1(a) and 1(b):
each of $R_1$ to $R_4$ is independently hydrogen, a unsubstituted or substituted C1-C30 alkyl group, a unsubstituted or substituted C1-C30 alkoxy group, a unsubstituted or substituted C6-C30 aryl group, a unsubstituted or substituted C6-C30 aryloxy group, a unsubstituted or substituted C3-C30 heteroaryl group, a unsubstituted or substituted C3-C30 heteroaryloxy group, a unsubstituted or substituted C4-C30 cycloalkyl group, or a unsubstituted or substituted C3-C30 heterocycloalkyl group,

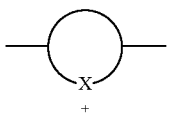

is a 3 to 31 membered ring including at least one heteroatom and 2 to 30 carbon atoms,
X is —N(R')(R"), —S(R'), or —P(R')(R"); and
each of R' and R" is idependently a C1-C30 alkyl group, a C1-C30 alkoxy group, a C6-C30 aryl group, a C6-C30 aryloxy group, a C3-C30 heteroaryl group, a C3-C30 heteroaryloxy group, a C4-C30 cycloalkyl group, or a C3-C30 heterocycloalkyl group;

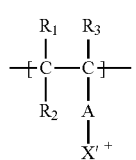

Formula 3 wherein in Formula 3:
X' is —N(R')(R")(R'''), —S(R'), —OP(R')(R")(R'''), or —P(R')(R")(R'''),
each of $R_1$ to $R_3$ is independently hydrogen, a unsubstituted or substituted C1-C30 alkyl group, a unsubstituted or substituted C1-C30 alkoxy group, a unsubstituted or substituted C6-C30 aryl group, a unsubstituted or substituted C6-C30 aryloxy group, a unsubstituted or substituted C3-C30 heteroaryl group, a unsubstituted or substituted C3-C30 heteroaryloxy group, a unsubstituted or substituted C4-C30 cycloalkyl group, or a unsubstituted or substituted C3-C30 heterocycloalkyl group,
A is selected from the group consisting of:
chemical bonds;
C1-C30 alkyl groups, C6-C30 aryl groups, C7-C30 arylalkyl groups, C1-C30 heteroaryl groups, C4-C30 cycloalkyl groups, and C1-C30 heterocycloalkyl groups; and
C1-C30 alkyls, C6-C30 aryls, C7-C30 arylalkyls, C1-C30 heteroaryls, C4-C30 carbon rings, and C1-C30 hetero rings substituted with at least one substituent selected from the group consisting of carbonyl groups, oxy groups, carbonyloxy groups, iminocarbonyl groups, iminosulfonyl groups, sulfanyl groups, sulfinyl groups, sulfonyl groups, sulfonyloxy groups, imino groups, methylene repeating units, methyleneoxide repeating units, ethyleneoxide repeating units, and propyleneoxide repeating units, and
each of R', R" and R''' is independently a C1-C30 alkyl group, a C1-C30 alkoxy group, a C6-C30 aryl group, a C6-C30 aryloxy group, a C3-C30 heteroaryl group, a C3-C30 heteroaryloxy group, a C4-C30 cycloalkyl group, or a C3-C30 heterocycloalkyl group;
wherein each of the second repeating unit of the first polymer compound and the second repeating unit of the second polymer compound is represented by Formula 4:

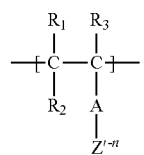

Formula 4 wherein in Formula 4:
Z' is a carboxylate group (—C(=O)O), a sulfate group ((—OS(=O)$_2$O), a sulfite group (—OS(=O)O), a sulfinate group (—S(=O)O), a phosphate group ((—OP(=O)(O)$_2$), or a phosphonate group (—P(=O)(O)$_2$),
each of $R_1$ to $R_3$ is independently hydrogen, a unsubstituted or substituted C1-C30 alkyl group, a unsubstituted or substituted C1-C30 alkoxy group, a unsubstituted or substituted C6-C30 aryl group, a unsubstituted or substituted C6-C30 aryloxy group, a unsubstituted or substituted C3-C30 heteroaryl group, a unsubstituted or substituted C3-C30 heteroaryloxy group, a unsubstituted or substituted C4-C30 cycloalkyl group, or a unsubstituted or substituted C3-C30 heterocycloalkyl group,
A is selected from the group consisting of:
chemical bonds;
C1-C30 alkyl groups, C6-C30 aryl groups, C7-C30 arylalkyl groups, C1-C30 heteroaryl groups. C4-C30 cycloalkyl groups, and C1-C30 heterocycloalkyl groups; and
C1-C30 alkyls C6-C30 aryls, C7-C30 arylalkyls, C1-C30 heteroaryls, C4-C30 carbon rings, and C1-C30 hetero rings substituted with at least one substituent selected from the group consisting of carbonyl groups, oxy groups, carbonyloxy groups, iminocarbonyl groups, iminosulfonyl groups, sulfanyl groups, sulfinyl groups, sulfonyl groups, sulfonyloxy groups, imino groups, methylene repeating units, methyleneoxide repeating units, ethyleneoxide repeating units, and propyleneoxide repeating units, and
n is 1 or 2;
or (ii) the first repeating unit is represented by Formula 3, the second repeating unit is represented by Formula 4, and each of the first and second polymer compounds further comprises a third repeating unit represented by Formula 23:

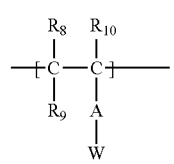

Formula 23 wherein in Formula 23:
  each of $R_8$ through $R_{10}$ is independently selected from the group consisting of hydrogen, unsubstituted or substituted C1-C30 alkyl groups, unsubstituted or substituted C1-C30 alkoxy groups, unsubstituted or substituted C6-C30 aryl groups, unsubstituted or substituted C6-C30 aryloxy groups, unsubstituted or substituted C3-C30 heteroaryl groups, unsubstituted or substituted C3-C30 heteroaryloxy groups, unsubstituted or substituted C4-C30 cycloalkyl groups, and unsubstituted or substituted C3-C30 heterocycloalkyl groups,
  A is selected from the group consisting of:
    chemical bonds;
    C1-C30 alkyl groups, C6-C30 aryl groups, C7-C30 arylalkyl groups, C1-C30 heteroaryl groups, C4-C30 cycloalkyl groups, and C1-C30 heterocycloalkyl groups; and
    C1-C30 alkyls C6-C30 aryls, C7-C30 arylalkyls, C1-C30 heteroaryls, C4-C30 carbon rings, and C1-C30 hetero rings substituted with at least one substituent selected from the group consisting of carbonyl groups, oxy groups, carbonyloxy groups, iminocarbonyl groups, iminosulfonyl groups, sulfanyl groups, sulfinyl groups, sulfonyl groups, sulfonyloxy groups, imino groups, methylene repeating units, methyleneoxide repeating units, ethyleneoxide repeating units, and propyleneoxide repeating units; and
  W is selected from the group consisting of carboxyl groups, hydroxyl groups, amine groups, amide groups, imide groups, nitrile groups, sulfone groups, halogen groups, silane groups, and Si(R')(R'')(R''') groups wherein each of R', R'' and R''' is independently a C1-C20 alkyl group, a C1-C20 alkoxy group, or a halogen atom;
  or (iii) the first repeating unit is represented by Formula 3, and the second repeating unit comprises 2 or 3 repeating units independently represented by Formula 4.

2. The electrode binder composition of claim 1, wherein the polymer composition is present in the electrode binder composition in an amount of about 0.2 to about 100 wt % based on a total weight of the electrode binder composition.

3. The electrode binder composition of claim 1, wherein the first polymer compound is represented by one of Formulae 14 through 16 and 19 through 22:

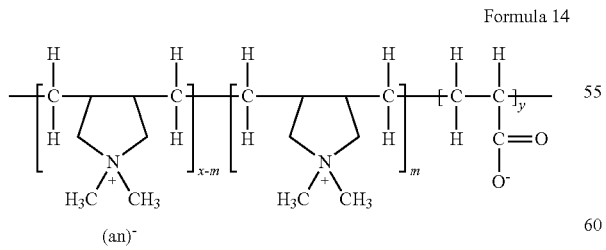

Formula 14 wherein, in Formula 14:
  x, y and m are molar fractions; and
  x>y, m=y, $0.5<x\leq0.95$, $0.05\leq y<0.5$, and x+y=1;

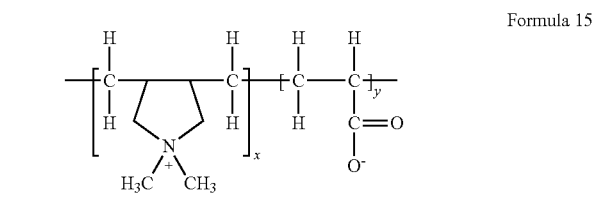

Formula 15 wherein, in Formula 15:
  x and y are molar fractions;
  x=0.5, and y=0.5;

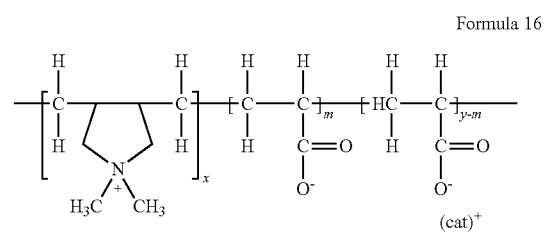

Formula 16 wherein, in Formula 16:
  x, y and m are molar fractions; and
  x<y, m=x, $0.5<y\leq0.95$, $0.05\leq x<0.5$, and x+y=1;

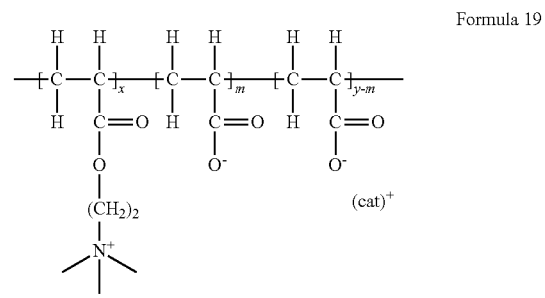

Formula 19 wherein, in Formula 19:
  x, y and m are molar fractions; and
  x<y, m=x, $0.5<y\leq0.95$, $0.05\leq x<0.5$, and x+y=1;

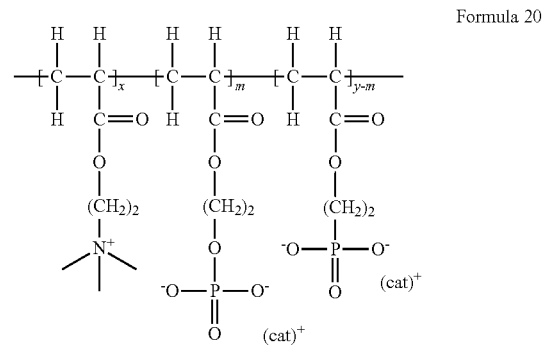

Formula 20 wherein, in Formula 20:
  x, y and m are molar fractions; and
  x<y, m=2x, $0.25<y\leq0.475$, $0.05\leq x<0.5$, and $0.525\leq x+y<0.75$;

Formula 21

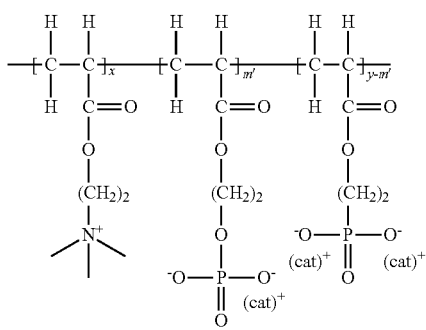

wherein, in Formula 21:
x, y and m' are molar fractions; and
x<y, m'=2x, 0.25<y≤0.475, 0.05≤x<0.5, and 0.525≤x+y<0.75;

Formula 22

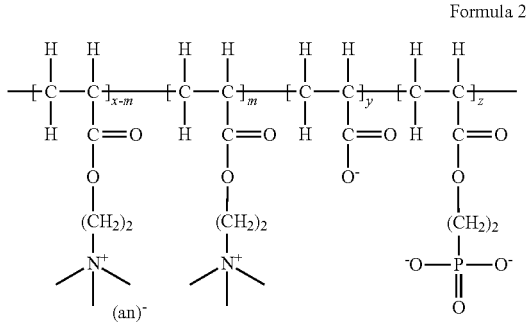

wherein, in Formula 22:
x, y, z and m are molar fractions; and
x>y, m=y+2z, 0.5<x≤0.95, 0.05≤y+2z<0.5, and x+y+2z=1;
wherein:
(cat)$^+$ is the cationic group of the first repeating unit of the second polymer compound; and
(an)$^-$ is the anionic group of the second repeating unit of the second polymer compound.

4. The electrode binder composition of claim 1, wherein the first polymer compound is represented by one of Formulae 24(a), 24(b), 25(a), 25(b), 26(a), 26(b) or 27 through 29:

Formula 24(a)

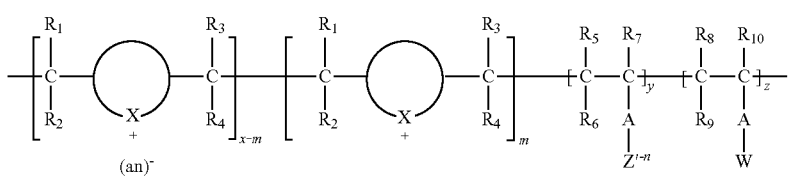

Formula 24(b)

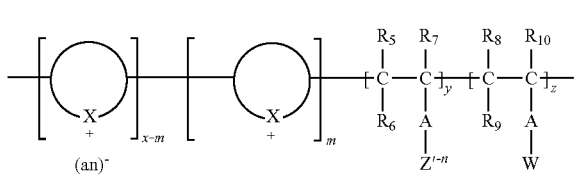

wherein, in Formulae 24(a) and 24(b):
n is 1;
x, y, z and m are molar fractions; and
x>y, m=y, 0.25<x≤0.94, 0.05≤y<0.25, 0.01≤z≤0.5 and x+y+z=1;

Formula 25(a)

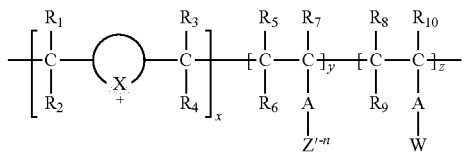

Formula 25(b)

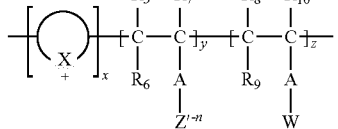

wherein, in Formulae 25(a) and 25(b):
n is 1;
x, y and z are molar fractions; and
x=y, 0.25<x≤0.495, 0.25<y≤0.495, 0.01≤z≤0.5, and x+y+z=1;

Formula 26(a)

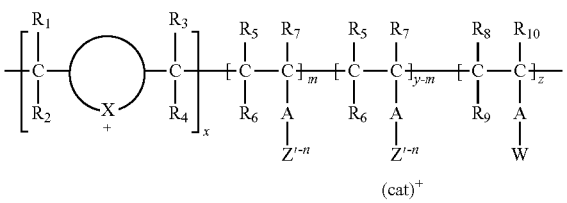

Formula 26(b)

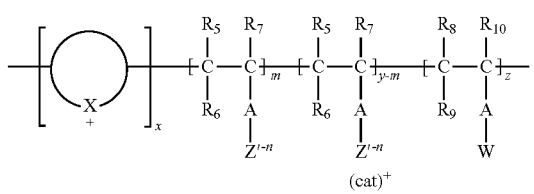

wherein, in Formulae 26(a) and 26(b):
n is 1;
x, y, z and m are molar fractions; and $x<y$, $m=x$, $0.25<y\leq 0.94$, $0.05\leq x<0.25$, $0.01\leq z\leq 0.5$, and $x+y+z=1$;

Formula 27

$$-\left[\begin{array}{cc}R_1 & R_3 \\ | & | \\ C-C \\ | & | \\ R_2 & A \\ & | \\ & X'^+\end{array}\right]_{x-m}\left[\begin{array}{cc}R_1 & R_3 \\ | & | \\ C-C \\ | & | \\ R_2 & A \\ & | \\ & X'^+\end{array}\right]_m\left[\begin{array}{cc}R_5 & R_7 \\ | & | \\ C-C \\ | & | \\ R_6 & A \\ & | \\ & Z'^{-n}\end{array}\right]_y\left[\begin{array}{cc}R_8 & R_{10} \\ | & | \\ C-C \\ | & | \\ R_9 & A \\ & | \\ & W\end{array}\right]_z-$$

(an)⁻ wherein, in Formula 27:
n is 1;
x, y, z and m are molar fractions; and
$x>y$, $m=y$, $0.25<x\leq 0.94$, $0.05\leq y<0.25$, $0.01\leq z\leq 0.5$, and $x+y+z=1$;

Formula 28

$$-\left[\begin{array}{cc}R_1 & R_3 \\ | & | \\ C-C \\ | & | \\ R_2 & A \\ & | \\ & X'^+\end{array}\right]_x\left[\begin{array}{cc}R_5 & R_7 \\ | & | \\ C-C \\ | & | \\ R_6 & A \\ & | \\ & Z'^{-n}\end{array}\right]_y\left[\begin{array}{cc}R_8 & R_{10} \\ | & | \\ C-C \\ | & | \\ R_9 & A \\ & | \\ & W\end{array}\right]_z-$$

wherein, in Formula 28:
n is 1;
x, y and z are molar fractions; and
$0.25<x\leq 0.94$, $0.25\leq y<0.5$, $0.01\leq z\leq 0.5$, and $x+y+z=1$;

Formula 29

$$-\left[\begin{array}{cc}R_1 & R_3 \\ | & | \\ C-C \\ | & | \\ R_2 & A \\ & | \\ & X'^+\end{array}\right]_x\left[\begin{array}{cc}R_5 & R_7 \\ | & | \\ C-C \\ | & | \\ R_6 & A \\ & | \\ & Z'^{-n}\end{array}\right]_m\left[\begin{array}{cc}R_5 & R_7 \\ | & | \\ C-C \\ | & | \\ R_6 & A \\ & | \\ & Z'^{-n}\end{array}\right]_{y-m}\left[\begin{array}{cc}R_8 & R_{10} \\ | & | \\ C-C \\ | & | \\ R_9 & A \\ & | \\ & W\end{array}\right]_z-$$

(cat)⁺ wherein, in Formula 29
n is 1;
x, y, z and m are molar fractions;
$x<y$, $m=x$, $0.25<y\leq 0.94$, $0.05\leq x<0.5$, $0.01\leq z\leq 0.5$, and $x+y+z=1$;
wherein:
A is selected from the group consisting of:
chemical bonds;
C1-C30 alkyl groups, C6-C30 aryl groups, C7-C30 arylalkyl groups, C1-C30 heteroaryl groups, C4-C30 cycloalkyl groups, and C1-C30 heterocycloalkyl groups; and
C1-C30 alkyls C6-C30 aryls, C7-C30 arylalkyls, C1-C30 heteroaryls, C4-C30 carbon rings, and C1-C30 hetero rings substituted with at least one substituent selected from the group consisting of carbonyl groups, oxy groups, carbonyloxy groups, iminocarbonyl groups, iminosulfonyl groups, sulfanyl groups, sulfinyl groups, sulfonyl groups, sulfonyloxy groups, imino groups, methylene repeating units, methyleneoxide repeating units, ethyleneoxide repeating units, and propyleneoxide repeating units;
X' is —N(R')(R")(R'''), —S(R'), —OP(R')(R")(R'''), or —P(R')(R")(R''');
Z' is a carboxylate group (—C(═O)O), a sulfate group ((—OS(═O)₂O), a sulfite group (—OS(═O)O), a sulfinate group (—S(═O)O), a phosphate group ((—OP(═O)(O)₂), or a phosphonate group (—P(═O)(O)₂),
W is selected from the group consisting of carboxyl groups, hydroxyl groups, amine groups, amide groups, imide groups, nitrile groups, sulfone groups, halogen groups, silane groups, and Si(R')(R")(R''') groups wherein each of R', R" and R''' is independently a C1-C20 alkyl group, a C1-C20 alkoxy group, or a halogen atom;

$$-\left[\begin{array}{c}\bigcirc \\ X \\ + \end{array}\right]-$$

is a 3 to 31 membered ring including at least one heteroatom and 2 to 30 carbon atoms;
each of $R_1$ through $R_3$ and $R_5$ through $R_{10}$ is independently selected from the group consisting of hydrogen, unsubstituted and substituted C1-C30 alkyl groups, unsubstituted and substituted C1-C30 alkoxy groups, unsubstituted and substituted C6-C30 aryl groups, unsubstituted and substituted C6-C30 aryloxy groups, unsubstituted and substituted C3-C30 heteroaryl groups, unsubstituted and substituted C3-C30 heteroaryloxy groups, unsubstituted and substituted C4-C30 cycloalkyl groups, and unsubstituted and substituted C3-C30 heterocycloalkyl groups;
(an)⁻ is the anionic group of the second repeating unit of the second polymer compound; and
(cat)⁺ is the cationic group of the first repeating unit of the second polymer compound.

5. The electrode binder composition of claim 4, wherein the first polymer compound has a degree of polymerization of about 100 to about 10,000, and a weight average molecular weight of about 5,000 to about 1,000,000 g/mol.

6. The electrode binder composition of claim 1, wherein the first polymer compound is independently selected from the group consisting of polymers represented by Formulae 16, 22, 26(b), 27 and 29:

Formula 16

$$-\left[\begin{array}{c}\text{...pyrrolidinium structure...}\end{array}\right]_x\left[\begin{array}{c}\text{...}\end{array}\right]\left[\begin{array}{c}\text{...}\end{array}\right]_m\left[\begin{array}{c}\text{...}\end{array}\right]_{y-m}-$$

(cat)⁺ wherein, in Formula 16, x, y and m are molar fractions, $x<y$, $m=x$, $0.05<x\leq 0.5$, $0.5\leq y<0.95$, and $x+y=1$;

Formula 22

$$-\left[\begin{array}{cc}H & H \\ | & | \\ C-C \\ | & | \\ H & C=O \\ & | \\ & O \\ & | \\ & (CH_2)_2 \\ & | \\ & N^+\end{array}\right]_{x-m}\left[\begin{array}{cc}H & H \\ | & | \\ C-C \\ | & | \\ H & C=O \\ & | \\ & O \\ & | \\ & (CH_2)_2 \\ & | \\ & N^+\end{array}\right]_m\left[\begin{array}{cc}H & H \\ | & | \\ C-C \\ | & | \\ H & C=O \\ & | \\ & O^-\end{array}\right]_y\left[\begin{array}{cc}H & H \\ | & | \\ C-C \\ | & | \\ H & C=O \\ & | \\ & O \\ & | \\ & (CH_2)_2 \\ & | \\ & O-P-O^- \\ & \parallel \\ & O\end{array}\right]_z-$$

(an)⁻ wherein, in Formula 22, x, y, z and m are molar fractions, $x<y$, $m=y+2z$, $0.5<x\leq 0.95$, $0.05\leq y+2z<0.5$, and $x+y+2z=1$;

Formula 26(b)

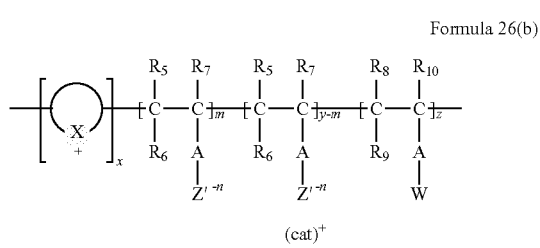

wherein, in Formula 26(b), n is 1, x, y, z and m are molar fractions, x<y, m=x, 0.05≤x<0.5, 0.25<y≤0.94, 0.01≤z≤0.5, and x+y+z=1;

Formula 27

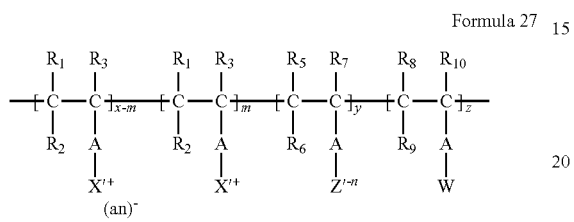

wherein, in Formula 27, n is 1, x, y, z and m are molar fractions, x>y, m=y, 0.25<x≤0.94, 0.05≤y<0.5, 0.01≤z≤0.5, and x+y+z=1;

Formula 29

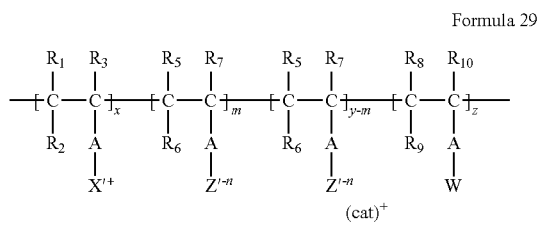

wherein, in Formula 29, x, y, z and m are molar fractions, n is 1, x<y, m=x, 0.05≤x<0.5, 0.25<y≤0.94, 0.01≤z≤0.5, and x+y+z=1;

wherein:
A is selected from the group consisting of:
chemical bonds;
C1-C30 alkyl groups, C6-C30 aryl groups, C7-C30 arylalkyl groups, C1-C30 heteroaryl groups, C4-C30 cycloalkyl groups, and C1-C30 heterocycloalkyl groups; and
C1-C30 alkyls C6-C30 aryls, C7-C30 arylalkyls, C1-C30 heteroaryls, C4-C30 carbon rings, and C1-C30 hetero rings substituted with at least one substituent selected from the group consisting of carbonyl groups, oxy groups, carbonyloxy groups, iminocarbonyl groups, iminosulfonyl groups, sulfanyl groups, sulfinyl groups, sulfonyl groups, sulfonyloxy groups, imino groups, methylene repeating units, methyleneoxide repeating units, ethyleneoxide repeating units, and propyleneoxide repeating units;
X' is —N(R')(R")(R'"), —S(R'), —OP(R')(R")(R'"), or —P(R')(R")(R");
Z' is a carboxylate group (—C(=O)O), a sulfate group ((—OS(=O)₂O), a sulfite group (—OS(=O)O), a sulfinate group (—S(=O)O), a phosphate group ((—OP(=O)(O)₂), or a phosphonate group (—P(=O)(O)₂),
W is selected from the group consisting of carboxyl groups, hydroxyl groups, amine groups, amide groups, imide groups, nitrile groups, sulfone groups, halogen groups, silane groups, and Si(R')(R")(R'") groups wherein each of R', R" and R'" is independently a C1-C20 alkyl group, a C1-C20 alkoxy group, or a halogen atom;

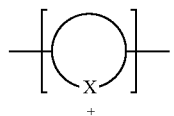

is a 3 to 31 membered ring including at least one heteroatom and 2 to 30 carbon atoms;
each of $R_1$ through $R_3$ and $R_5$ through $R_{10}$ is independently selected from the group consisting of hydrogen, unsubstituted and substituted C1-C30 alkyl groups, unsubstituted and substituted C1-C30 alkoxy groups, unsubstituted and substituted C6-C30 aryl groups, unsubstituted and substituted C6-C30 aryloxy groups, unsubstituted and substituted C3-C30 heteroaryl groups, unsubstituted and substituted C3-C30 heteroaryloxy groups, unsubstituted and substituted C4-C30 cycloalkyl groups, and unsubstituted and substituted C3-C30 heterocycloalkyl groups;
(an)⁻ is the anionic group of the second repeating unit of the second polymer compound; and
(cat)⁺ is the cationic group of the first repeating unit of the second polymer compound.

7. A rechargeable lithium battery, comprising:
a first electrode comprising a first electrode active material and the polymer compound of claim 1;
a second electrode comprising a second electrode active material; and
an electrolyte.

8. The rechargeable lithium battery of claim 7, wherein the first electrode is a negative electrode and the first electrode active material is a negative electrode active material.

9. The electrode binder composition of claim 1, wherein the first polymer compound is selected from a polymer represented by one of Formula 27(a), 26(a) 29(a), 22(a) and 16(a):

Formula 27(a)

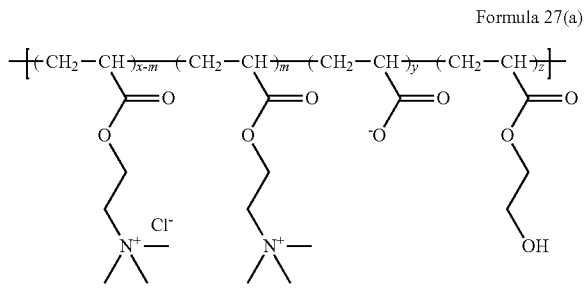

wherein, in Formula 27a, m is 0.4, x is 0.5, y is 0.4, and z is 0.1;

Formula 26(a)

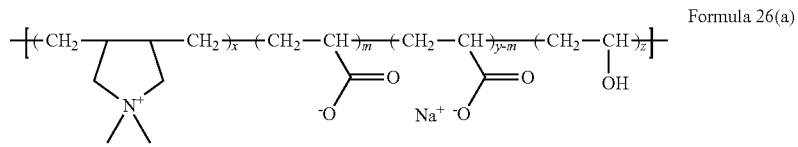

wherein, in Formula 26a, m is 0.3, x is 0.3, y is 0.6, and z is 0.1;
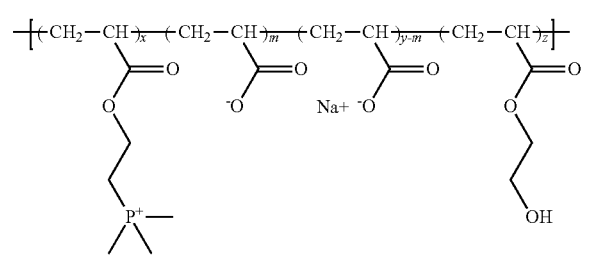
Formula 29(a)
wherein, in Formula 29a, m is 0.3, x is 0.3, y is 0.6, and z is 0.1;
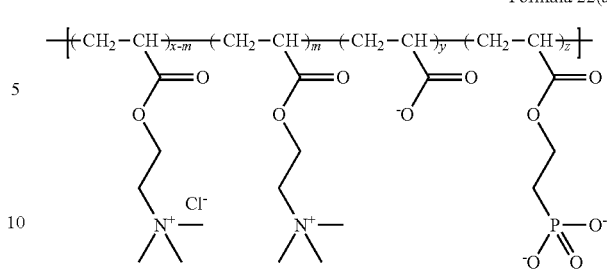
Formula 22(a)
wherein, in Formula 22a, m is 0.4, x is 0.7, y is 0.2, and z is 0.1; and
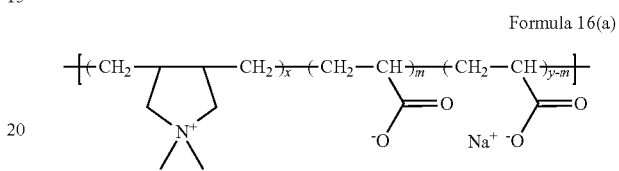
Formula 16(a)
wherein, in Formula 16a, x is 0.3, y is 0.7, and m is 0.3.
* * * * *